(12) United States Patent
McCandlish

(10) Patent No.: US 7,787,703 B2
(45) Date of Patent: *Aug. 31, 2010

(54) METHOD AND SYSTEM FOR EXTENDING BINARY IMAGE DATA TO CONTONE IMAGE DATA

(75) Inventor: Peter D. McCandlish, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1083 days.

This patent is subject to a terminal disclaimer.

(21) Appl. No.: 11/126,970

(22) Filed: May 11, 2005

(65) Prior Publication Data

US 2006/0257045 A1  Nov. 16, 2006

(51) Int. Cl.
*G06K 9/40* (2006.01)

(52) U.S. Cl. .................... 382/261; 358/2.1; 358/448
(58) Field of Classification Search ................ 382/261
See application file for complete search history.

(56) References Cited

U.S. PATENT DOCUMENTS

| | | | |
|---|---|---|---|
| 4,958,236 A | 9/1990 | Nagashima et al. | |
| 5,008,950 A | 4/1991 | Katayama et al. | |
| 5,065,255 A | 11/1991 | Kimura et al. | |
| 5,293,430 A | 3/1994 | Shiau et al. | |
| 5,323,232 A | 6/1994 | Otaka et al. | |
| 5,347,599 A | 9/1994 | Yamashita et al. | |
| 5,572,606 A | 11/1996 | Tanioka | |
| 5,617,459 A * | 4/1997 | Makram-Ebeid et al. | 378/62 |
| 5,754,710 A | 5/1998 | Sekine et al. | |
| 5,818,964 A * | 10/1998 | Itoh | 382/205 |
| 5,850,474 A | 12/1998 | Fan et al. | |
| 5,877,813 A * | 3/1999 | Lee et al. | 375/240.12 |
| 5,883,983 A * | 3/1999 | Lee et al. | 382/268 |
| 5,959,290 A | 9/1999 | Schweid et al. | |
| 5,970,179 A * | 10/1999 | Ito | 382/261 |
| 5,974,197 A * | 10/1999 | Lee et al. | 382/268 |
| 6,020,979 A | 2/2000 | Zeck et al. | |
| 6,130,966 A | 10/2000 | Sekine et al. | |
| 6,167,164 A * | 12/2000 | Lee | 382/261 |
| 6,226,050 B1 * | 5/2001 | Lee | 348/607 |
| 6,229,578 B1 | 5/2001 | Acharya et al. | |
| 6,240,205 B1 | 5/2001 | Fan et al. | |

(Continued)

FOREIGN PATENT DOCUMENTS

EP 1583064 10/2005

(Continued)

OTHER PUBLICATIONS

File History for U.S. Appl. No. 11/272,182, as of Feb. 10, 2009.

(Continued)

*Primary Examiner*—Sath V Perungavoor
(74) *Attorney, Agent, or Firm*—Michael J. Nickerson; Basch & Nickerson LLP

(57) ABSTRACT

A method and system converts a binary image into an analog image by first tagging pixels that are part of edges in the digital image and using this tagging information to eliminate such tagged pixels from the digital filtering process. The elimination of such tagged pixels from the digital filtering process substantially eliminates artifacts near the edges, thereby reducing any distraction from the perceived quality of the output image.

13 Claims, 11 Drawing Sheets

U.S. PATENT DOCUMENTS

| | | | |
|---|---|---|---|
| 6,259,823 B1 * | 7/2001 | Lee et al. | 382/268 |
| 6,282,325 B1 | 8/2001 | Han | |
| 6,285,464 B1 | 9/2001 | Katayama et al. | |
| 6,330,372 B1 * | 12/2001 | Goldstein et al. | 382/266 |
| 6,343,159 B1 * | 1/2002 | Cuciurean-Zapan et al. | 382/284 |
| 6,427,030 B1 | 7/2002 | Williams et al. | |
| 6,477,282 B1 | 11/2002 | Ohtsuki et al. | |
| 6,480,302 B1 * | 11/2002 | Kawano | 358/2.1 |
| 6,594,401 B1 | 7/2003 | Metcalfe et al. | |
| 6,606,420 B1 * | 8/2003 | Loce et al. | 382/266 |
| 6,608,701 B1 | 8/2003 | Loce et al. | |
| 6,683,702 B1 | 1/2004 | Loce et al. | |
| 6,760,123 B1 * | 7/2004 | Harrington et al. | 358/1.9 |
| 6,771,832 B1 | 8/2004 | Naito et al. | |
| 6,807,313 B1 * | 10/2004 | Allen et al. | 382/254 |
| 6,873,437 B1 | 3/2005 | Kuwahara et al. | |
| 6,920,252 B2 * | 7/2005 | Rouvellou | 382/275 |
| 6,975,434 B1 | 12/2005 | Pilu et al. | |
| 7,079,289 B2 | 7/2006 | Loce et al. | |
| 7,352,490 B1 * | 4/2008 | Tse et al. | 358/1.9 |
| 7,372,992 B2 | 5/2008 | Ohshita | |
| 7,409,092 B2 * | 8/2008 | Srinivasa | 382/199 |
| 7,440,139 B2 | 10/2008 | Loce et al. | |
| 7,460,276 B2 | 12/2008 | Xu et al. | |
| 7,580,569 B2 | 8/2009 | Tse et al. | |
| 2002/0122602 A1 * | 9/2002 | Rouvellou | 382/261 |
| 2002/0126912 A1 * | 9/2002 | Rouvellou | 382/268 |
| 2002/0140983 A1 | 10/2002 | Shimizu | |
| 2002/0159096 A1 * | 10/2002 | Sun et al. | 358/3.26 |
| 2002/0181797 A1 * | 12/2002 | Young | 382/260 |
| 2002/0191857 A1 | 12/2002 | Macy | |
| 2003/0007687 A1 | 1/2003 | Nesterov et al. | |
| 2003/0043210 A1 | 3/2003 | Hanks | |
| 2003/0090729 A1 | 5/2003 | Loce et al. | |
| 2003/0091222 A1 * | 5/2003 | Young et al. | 382/132 |
| 2003/0193680 A1 | 10/2003 | Karidi | |
| 2004/0114814 A1 | 6/2004 | Boliek et al. | |
| 2004/0175037 A1 | 9/2004 | Guleryuz | |
| 2005/0206948 A1 * | 9/2005 | Uejo | 358/1.15 |
| 2005/0259886 A1 | 11/2005 | Shan | |
| 2005/0270582 A1 | 12/2005 | Hara | |
| 2006/0077489 A1 | 4/2006 | Zhang et al. | |
| 2006/0115182 A1 | 6/2006 | Deng et al. | |
| 2006/0132847 A1 | 6/2006 | Xu et al. | |
| 2006/0232798 A1 | 10/2006 | Xu et al. | |
| 2007/0053003 A1 | 3/2007 | Loce et al. | |
| 2007/0103731 A1 * | 5/2007 | Tse et al. | 358/3.27 |
| 2007/0109602 A1 | 5/2007 | Tse | |
| 2007/0172148 A1 | 7/2007 | Hawley | |
| 2007/0172149 A1 | 7/2007 | Cuciurean-Zapan et al. | |
| 2007/0258101 A1 | 11/2007 | Nagarajan et al. | |
| 2008/0049238 A1 | 2/2008 | Nagarajan et al. | |

FOREIGN PATENT DOCUMENTS

| | | |
|---|---|---|
| EP | 1601184 | 11/2005 |
| GB | 2291308 | 1/1996 |
| JP | 09-051431 | 2/1997 |
| WO | WO9930547 | 6/1999 |

OTHER PUBLICATIONS

File History for U.S. Appl. No. 11/281,267 as of Jan. 27, 2009.
European Search Report dated Feb. 25, 2009 for European Patent Application No. 06113615.6, which corresponds to Pending U.S. Appl. No. 11/126,970.
File History for U.S. Appl. No. 11/340,380 as of Nov. 17, 2008.
File History for U.S. Appl. No. 11/272,182, as of Oct. 6, 2008.
File History for U.S. Appl. No. 11/340,391, as of Oct. 6, 2008.
File History for U.S. Appl. No. 11/281,267 as of Oct. 8, 2008.
File History for U.S. Appl. No. 11/268,147 as of Oct. 8, 2008.
File History for U.S. Appl. No. 11/467,584 as of Oct. 8, 2008.
He, Z.; Chang, T.; Allebach, J.; Bouman C.; Boundary Stitching Algorithm for Parallel Implementation of Error Diffusion; Xerox Corporation.
Farzin Aghdasi and Rahab K. Ward, Reduction of Boundary Artifacts in Image Restoration, IEEE Transactions on Image Processing, vol. 5, No. 4, Apr. 1996, pp. 611-618.
File History for US Patent 7440139.
File History for US Patent 7460276.
File History for U.S. Appl. No. 10/923,116 as of Dec. 9, 2008.
File History for U.S. Appl. No. 11/104,758 as of Dec. 9, 2008.
File History for U.S. Appl. No. 11/218,966 as of Dec. 9, 2008.
File history between Dec. 9, 2008 and Sep. 1, 2009 for US Patent 7,580,569.
File history between Dec. 9, 2008 and Sep. 1, 2009 for U.S. Appl. No. 11/104,758.
File history between Feb. 10, 2009 and Sep. 1, 2009 for U.S. Appl. No. 11/272,182.
File history between Jan. 27, 2009 and Sep. 1, 2009 for U.S. Appl. No. 11/281,267.
File history between Dec. 9, 2008 and Sep. 1, 2009 for U.S. Appl. No. 11/467,584.
File history, between Jan. 27, 2009 and Oct. 19, 2009 for U.S. Appl. No. 11/281,267.
A European Office Action Dated Oct. 15, 2009 for European Patent Application EP06113615.6 (Corresponding to U.S. Appl. No. 11/126,970).
A Machine Translation of Japanese patent publication JP09-051431 cited in a Japanese Office Action dated Nov. 30, 2009 for JPA2006-128283, Japanese counterpart application of U.S. Appl. No. 11/126,970.
The prosecution history of U.S. Appl. No. 11/467,584 as of Dec. 22, 2009.

* cited by examiner

METHOD AND SYSTEM FOR EXTENDING BINARY IMAGE DATA TO CONTONE IMAGE DATA

BACKGROUND AND SUMMARY

Digital multifunction reprographic systems are now well known and have replaced optical reprographic systems as a way to reproduce images. In these conventional digital multifunction reprographic systems, a scanner accepts a document to be copied and converts the document into electronic image(s). These images, usually in the form of pages, are then passed to a central control unit which may re-order or reorganize these pages and then, depending on the request of the user of the device, send the pages or images to a destination. Often this destination is an attached printing unit which makes one or more copies of the original document.

However, these conventional devices perform many other functions besides simple copying. The central control unit is usually equipped with a combination of hardware and software elements that enable it to accept input from other sources. The other sources may include some sort of network interface and/or an interface to a telephone system to enable FAX input.

The network interface is usually configured so that it can accept jobs to be printed from any computer source that is connected to the network. This configuration normally includes elements that can convert input documents formatted in one or more page description languages (PDLs) to the native format of the printing device.

An important inner component of such a conventional multifunction digital device is the image path. This is the combination of software and hardware elements that accepts the electronic images from the multiplicity of sources and performs any operations needed to convert the images to the format desired for the various output paths. The image path is usually one of the more complex and costly components of such digital multifunction devices.

The image path for a conventional multifunction device usually has several constraints. One the hand, there is a desire to make the image path utilize data in a multi-bit per pixel format so as to provide for maximum image quality and a minimum loss of critical information in the transformation of documents from paper to electronic form. On the other hand, there are cost constraints and perhaps performance limits on the devices or software that comprise the image path.

Conventional image path electronics may also utilize binary image paths. In this situation, if the input information is scanned in a binary manner at sufficiently high resolution, the scanned image can be reconstructed at the output with little or no perceptible loss of image quality.

Another component of many conventional multifunction devices, especially for those devices having a printing engine that is capable of producing colored output, is the use of analog modulation schemes for the output. In these devices, analog data, in the form of multi-bit pixels, is presented to the modulator of the output printing device. The modulator compares the analog equivalent of the input byte of data to a periodic saw tooth wave. The output therefrom is a signal to the laser imaging component that is pulsewidth modulated by the data stream.

One way to implement the resolution coverage is to pass the binary data through a digital equivalent of a two-dimensional low pass filter. The digital equivalent of a two-dimensional low pass filter may replace each pixel in the binary image by the average of the values within some window centered on the pixel of interest. While such a system does an adequate job of converting the high resolution binary data to analog data, these solutions also have the deleterious effect of smearing sharp edges in the original document. Such an effect is particularly detrimental when reproducing text and line art.

FIG. 1 shows, in schematic form, an example of a conventional filtering process. For this illustrative example, a 3×3 pixel filter is described. It is noted that any size filter may be utilized. Moreover, the pixel filter may perform simple averaging or be constructed of a more complex filter kernel. Notwithstanding the size or complexity of the filter, a description of a simple 3×3 pixel filter example will provide a demonstration of the principles of operation of this filter.

In FIG. 1, a portion of an image 101, in the form of a matrix, is shown. In the portion of the image 101, a vertical edge transitioning from black to white is shown, whereby a black region, represented by the numeric binary values "1" and slashed boxes, occupies the leftmost vertical column, and a white region, represented by the numeric binary values "0" and non-slashed boxes, occupies the center and rightmost vertical columns of the portion of the image 101. A filter kernel 102 provide a simple matrix of filter weights wherein an output pixel is the evenly weighted average of the nine pixels covered by the filter kernel 102. After a filter 104 performs the filtering operation, a portion of a output image 103 is generated.

The portion of the output image 103, as illustrated in FIG. 1, demonstrates that the original sharp edge of the portion of the image 101 has been smeared. More specifically, the original edge of the portion of the image 101 made the transition from "1" to "0" in a width of a single pixel. On the other hand, the filtered edge of the portion of the output image 103 now covers a width of three pixels.

In other words, when the pixel A of the portion of the image 101 of FIG. 1 is processed by the filter 104, the output pixel A' of the portion of the output image 103 has a value of zero indicating, in this example, a white region, assuming that the column to the right of the rightmost illustrated column contained only "0" values. It is noted that the pixel of interest has a filter position that is associated with the highlighted pixel position F. Moreover, when the pixel B of the portion of the image 101 is processed by the filter 104, the output pixel B' of the portion of the output image 103 has a value of "⅓" indicating, in this example, a grey region. Furthermore, when the pixel C of the portion of the image 101 is processed by the filter 104, the output pixel C' of the portion of the output image 103 has a value of "⅔" indicating, in this example, a grey region. Lastly, as illustrated, when the two columns to the left of the leftmost illustrated column contain only "1" values and the center pixel D of the portion of the image 101 is processed by the filter 104, the resulting output pixel D' of the portion of the output image 103 has a value of "1" indicating, in this example, a black region.

FIG. 2 shows a block diagram of a conventional device to implement the process illustrated in FIG. 1 and described above. As illustrated in FIG. 2, image data 201 is sent to a digital filter module 202, which accepts the image data and filter kernel data 203 and digitally filters to the image data. The output of digital filter module 202 is sent to an image output terminal (IOT) 250, which converts the image data to a hard copy of the image.

As noted above, the blurring of the output edge can be resolved through the use of tag data in conjunction with the image data. More specifically, if the pixel in question within the binary image is matched with a tag bit that indicates that it is an edge pixel, the filter is not applied to that pixel, but an analog level corresponding to high or low density, as the binary image bit is one or zero is output instead. FIG. 3 provides an illustration of this tag data integrated process.

In FIG. 3, a portion of an image 301, in the form of a matrix, is shown. In the portion of the image 301, a vertical edge transitioning from black to white is shown, whereby a black region, represented by the numeric binary values "1" and slashed boxes, occupies the leftmost vertical column, and a white region, represented by the numeric binary values "0" and non-slashed boxes, occupies the center and rightmost vertical columns of the portion of the image 301. A filter kernel 302 provides a simple matrix of filter weights wherein an output pixel is the evenly weighted average of the nine pixels covered by the filter kernel 302. After a filter 304 performs the filtering operation, a portion of a output image 303 is generated.

The portion of the output image 303, as illustrated in FIG. 3, demonstrates that the original sharp edge of the portion of the image 301 has been converted to a sharp edge 306 with a ghost image artifact 307. More specifically, the original edge of the portion of the image 301 made the transition from "1" to "0" in a width of a single pixel. On the other hand, the filtered edge 306 of the portion of the output image 303 has a transition 306 from "1" to "0" being a width of a single pixel and a ghost artifact 307.

In other words, when the pixel A of the portion of the image 301 of FIG. 3 is processed by the filter 304, the output pixel A' of the portion of the output image 303 has a value of "¼" indicating, in this example, a ghost artifact 307, assuming that the column to the right of the rightmost illustrated column contained only "0" values. It is noted that the pixel of interest has a filter position that is associated with the highlighted pixel position F. Since pixel A of the portion of the image 301 had not been tagged as an edge, the filter value for the pixel A of the portion of the image 301 is selected as the output value for output pixel A' of the portion of the output image 303. This selection of the filter value means that the output value includes the residual filter values, thereby creating the ghost artifact 307.

Moreover, when the pixel B of the portion of the image 301 is processed by the filter 304, the output pixel B' of the portion of the output image 303 has a value of "0" indicating, in this example, a white region because pixel B of the portion of the image 301 had been tagged as an edge, and thus, the filter value for the pixel B of the portion of the image 301 is not selected as the output value for output pixel B' of the portion of the output image 303, but the actual value of pixel B of the portion of the image 301 is passed through as the output pixel B' of the portion of the output image 303.

Furthermore, when the pixel C of the portion of the image 301 is processed by the filter 304, the output pixel C' of the portion of the output image 303 has a value of "1" indicating, in this example, a black region because pixel C of the portion of the image 301 had been tagged as an edge, and thus, the filter value for the pixel C of the portion of the image 301 is not selected as the output value for output pixel C' of the portion of the output image 303, but the actual value of pixel C of the portion of the image 301 is passed through as the output pixel C' of the portion of the output image 303.

Lastly, when the two columns to the left of the leftmost illustrated column contain only "1" values and the center pixel D of the portion of the image 301 is processed by the filter 304, the resulting output pixel D' of the portion of the output image 303 has a value of "1" indicating, in this example, a black region because pixel D of the portion of the image 301 had not been tagged as an edge, and thus, the filter value for the pixel D of the portion of the image 301 is selected as the output value for output pixel D' of the portion of the output image 303.

FIG. 4 shows a block diagram of another conventional device to implement the process illustrated in FIG. 3 and described above. As illustrated in FIG. 4, image data 401 is sent to two modules. The first module, a digital filter module 402, accepts the image data and filter kernel data 403 and digitally filters the image data. The second module, a "255/0" module 404, outputs either 255 (all 8 bits ON) or 0 (all 8 bits OFF) depending on whether the input pixel has a value of "1" or "0." The output of these two modules is sent to a selector module 405. The output of the selector module 405, which is controlled by the tag data stream 406, is sent to an image output terminal (IOT) 450, which converts the image data to a hard copy of the image. If the tag bit is 1, the selector output is identical to the "255/0" module 404, and if the tag bit is 0, the selector output is identical to the output of the digital filter module 402.

However, as demonstrated above, the conventional edge reconstruction process can generate artifacts that while less objectionable than the softening of a simple filtering process are nevertheless detrimental to the overall quality of the resulting image. FIG. 7 shows an example of how the conventional edge reconstruction process can create an artifact, ghost image 710. As described above, an image is processed to create the desired image 700, but due to the filtering process, an artifact, a ghost image 710, is also created. The artifact, a ghost image 710, arises because the edge pixels are included in the filtering process.

As discussed above, a variety of conventional systems have addressed this issue by attempting to minimize the edge softening of the filter. Another such system, as described in U.S. Pat. No. 6,130,966, adds a second bit to each pixel, where the second bit "tags" the pixel wherein the tag indicates whether or not the pixel is part of an edge. This tag information is carried through the image path and can be used in other places besides the output conversion stage to modify processing of the image data to best preserve edge information and sharpness. The entire content of U.S. Pat. No. 6,130,966 is hereby incorporated by reference.

Although some conventional systems have attempted to minimize the edge softening of the filter, artifacts can still be created near edges in the analog output. These artifacts detract from the perceived quality of the output.

Therefore, it is desirable to provide a system or methodology that implements a conversion of high resolution binary image data to analog that prevents the smearing of sharp edges and is substantially free of edge artifacts.

One aspect of a method that converts edge-tagged pixels of image data to pixels of contone image data determines a tagged state value of each pixel of image data within a predefined neighborhood of pixels, each pixel of image data within the predefined neighborhood of pixels having an associated image value, a first pixel of image data within the predefined neighborhood of pixels being associated a first pixel of contone image data; filters, using a predetermined set of filter weighting values wherein each pixel of image data within the predefined neighborhood of pixels has an associated filter weighting value, each image value of each pixel of image data within the predefined neighborhood of pixels having a tagged state value indicating that the pixel of image data is a non-edge pixel to generate a filtered image value for each pixel of image data within the predefined neighborhood of pixels having a tagged state value indicating that the pixel of image data is a non-edge pixel; assigns, a predetermined filtered image value to each pixel of image data within the predefined neighborhood of pixels having a tagged state value indicating that the pixel of image data is an edge pixel; sums all filtered image values for the predefined neighborhood of pixels to produce an image data sum value; and assigns, when the tagged state value of the first pixel of image data indicates the first pixel of image data is a non-edge pixel, the image data sum value as an image data value for the first pixel of contone image data.

Another aspect of a method that extends edge-tagged pixels of image data to pixels of contone image data determines a tagged state value of each pixel of image data within a predefined neighborhood of pixels, each pixel of image data within the predefined neighborhood of pixels having an associated image value, a first pixel of image data within the predefined neighborhood of pixels being associated a first pixel of contone image data; determines a number, N, pixels of image data within the predefined neighborhood of pixels having a tagged state value indicating that the pixel of image data is a non-edge pixel; modifies, when the tagged state value of the first pixel of image data indicates the first pixel of image data is a non-edge pixel, a predetermined set of filter weighting values wherein each pixel of image data within the predefined neighborhood of pixels has an associated filter weighting value, such that each filter weighting value associated with pixels of image data within the predefined neighborhood of pixels having a tagged state value indicating that the pixel of image data is a non-edge pixel is equal to 1/N and each filter weighting value associated with pixels of image data within the predefined neighborhood of pixels having a tagged state value indicating that the pixel of image data is an edge pixel is equal to 0; modifies, when the tagged state value of the first pixel of image data indicates the first pixel of image data is an edge pixel, the predetermined set of filter weighting values such that the filter weighting value associated with the first pixel of image data is equal to 1 and each filter weighting value associated with a non-first pixel of image data within the predefined neighborhood of pixels is equal to 0; filters, using the modified set of filter weighting values, each pixel of image data within the predefined neighborhood of pixels to generate a filtered image value for each pixel of image data within the predefined neighborhood of pixels; sums all filtered image values for the predefined neighborhood of pixels to produce an image data sum value; and assigns the image data sum value as an image data value for the first pixel of contone image data.

A further aspect of a method that extends edge-tagged pixels of image data to pixels of contone image data determines a tagged state value of each pixel of image data within a predefined neighborhood of pixels, each pixel of image data within the predefined neighborhood of pixels having an associated image value, a first pixel of image data within the predefined neighborhood of pixels being associated a first pixel of contone image data; determines a sum, S, of all filter weighting values within the predetermined set of filter weighting values associated with pixels of image data within the predefined neighborhood of pixels having a tagged state value indicating that the pixel of image data is a non-edge pixel; modifies, when the tagged state value of the first pixel of image data indicates the first pixel of image data is a non-edge pixel, a predetermined set of filter weighting values wherein each pixel of image data within the predefined neighborhood of pixels has an associated filter weighting value, such that each filter weighting value associated with pixels of image data within the predefined neighborhood of pixels having a tagged state value indicating that the pixel of image data is a non-edge pixel is equal to a product of the predetermined filter weighting value and 1/S and each filter weighting value associated with pixels of image data within the predefined neighborhood of pixels having a tagged state value indicating that the pixel of image data is an edge pixel is equal to 0; modifies, when the tagged state value of the first pixel of image data indicates the first pixel of image data is an edge pixel, the predetermined set of filter weighting values such that the filter weighting value associated with the first pixel of image data is equal to 1 and each filter weighting value associated with a non-first pixel of image data within the predefined neighborhood of pixels is equal to 0; filters, using the modified set of filter weighting values, each pixel of image data within the predefined neighborhood of pixels to generate a filtered image value for each pixel of image data within the predefined neighborhood of pixels; sums all filtered image values for the predefined neighborhood of pixels to produce an image data sum value; and assigns the image data sum value as an image data value for the first pixel of contone image data.

Another aspect of a method that extends edge-tagged pixels of image data to pixels of contone image data determines a tagged state value of each pixel of image data within a predefined neighborhood of pixels, each pixel of image data within the predefined neighborhood of pixels having an associated image value, a first pixel of image data within the predefined neighborhood of pixels being associated a first pixel of contone image data; determines a number, N, pixels of image data within the predefined neighborhood of pixels having a tagged state value indicating that the pixel of image data is a non-edge pixel; modifies, when the tagged state value of the first pixel of image data indicates the first pixel of image data is a non-edge pixel, a predetermined set of filter weighting values wherein each pixel of image data within the predefined neighborhood of pixels has an associated filter weighting value, such that each filter weighting value associated with pixels of image data within the predefined neighborhood of pixels having a tagged state value indicating that the pixel of image data is a non-edge pixel is equal to 1/N and each filter weighting value associated with pixels of image data within the predefined neighborhood of pixels having a tagged state value indicating that the pixel of image data is an edge pixel is equal to 0; modifies, when the tagged state value of the first pixel of image data indicates the first pixel of image data is an edge pixel, the predetermined set of filter weighting values such that the filter weighting value associated with the first pixel of image data is equal to 1 and each filter weighting value associated with a non-first pixel of image data within the predefined neighborhood of pixels is equal to 0; sums, only filter weighting values that are associated with pixels within the predefined neighborhood of pixels having an image value indicating a non-zero intensity value, to produce an image data sum value; and assigns the image data sum value as an image data value for the first pixel of contone image data.

Another aspect of a method that extends edge-tagged pixels of image data to pixels of contone image data determines a tagged state value of each pixel of image data within a predefined neighborhood of pixels, each pixel of image data within the predefined neighborhood of pixels having an associated image value, a first pixel of image data within the predefined neighborhood of pixels being associated a first pixel of contone image data; determines a sum, S, of all filter weighting values within the predetermined set of filter weighting values associated with pixels of image data within the predefined neighborhood of pixels having a tagged state value indicating that the pixel of image data is a non-edge pixel; modifies, when the tagged state value of the first pixel of image data indicates the first pixel of image data is a non-edge pixel, a predetermined set of filter weighting values wherein each pixel of image data within the predefined neighborhood of pixels has an associated filter weighting value, such that each filter weighting value associated with pixels of image data within the predefined neighborhood of pixels having a tagged state value indicating that the pixel of image data is a non-edge pixel is equal to a product of the predetermined filter weighting value and 1/S and each filter weighting value associated with pixels of image data within the predefined neighborhood of pixels having a tagged state value indicating that the pixel of image data is an edge pixel is equal to 0; modifies, when the tagged state value of the first pixel of image data indicates the first pixel of image data is an edge pixel, the predetermined set of filter weighting values such that the filter weighting value associated with the first pixel of image data is equal to 1 and each filter weighting value associated with a non-first pixel of image data within the predefined neighborhood of pixels is equal to 0; sums, only filter weighting values that are associated with pixels within the predefined neighborhood of pixels having an image value indicating a non-zero intensity value, to produce an image data sum value; and assigns the image data sum value as an image data value for the first pixel of contone image data.

One aspect of a system that converts edge-tagged pixels of image data to pixels of contone image data includes a selection circuit to determine a tagged state value of each pixel of image data within a predefined neighborhood of pixels, each pixel of image data within the predefined neighborhood of pixels having an associated image value, a first pixel of image data within the predefined neighborhood of pixels being associated a first pixel of contone image data; a filter circuit to filter, using a predetermined set of filter weighting values wherein each pixel of image data within the predefined neighborhood of pixels has an associated filter weighting value, each image value of each pixel of image data within the predefined neighborhood of pixels having a tagged state value indicating that the pixel of image data is a non-edge pixel to generate a filtered image value for each pixel of image data within the predefined neighborhood of pixels having a tagged state value indicating that the pixel of image data is a non-edge pixel; and an accumulator to sum all filtered image values for the predefined neighborhood of pixels to produce an image data sum value. The selection circuit selects a predetermined filtered image value for each pixel of image data within the predefined neighborhood of pixels having a tagged state value indicating that the pixel of image data is an edge pixel. The selection circuit selects the filtered image value from the filter circuit for each pixel of image data within the predefined neighborhood of pixels having a tagged state value indicating that the pixel of image data is a non-edge pixel.

Another aspect of a system that extends edge-tagged pixels of image data to pixels of contone image data includes a filter weight modifier circuit to determine a tagged state value of each pixel of image data within a predefined neighborhood of pixels, each pixel of image data within the predefined neighborhood of pixels having an associated image value, a first pixel of image data within the predefined neighborhood of pixels being associated a first pixel of contone image data. The filter weight modifier circuit determines a number, N, pixels of image data within the predefined neighborhood of pixels having a tagged state value indicating that the pixel of image data is a non-edge pixel. The filter weight modifier circuit modifies, when the tagged state value of the first pixel of image data indicates the first pixel of image data is a non-edge pixel, a predetermined set of filter weighting values wherein each pixel of image data within the predefined neighborhood of pixels has an associated filter weighting value, such that each filter weighting value associated with pixels of image data within the predefined neighborhood of pixels having a tagged state value indicating that the pixel of image data is a non-edge pixel is equal to 1/N and each filter weighting value associated with pixels of image data within the predefined neighborhood of pixels having a tagged state value indicating that the pixel of image data is an edge pixel is equal to 0. The filter weight modifier circuit modifies, when the tagged state value of the first pixel of image data indicates the first pixel of image data is an edge pixel, the predetermined set of filter weighting values such that the filter weighting value associated with the first pixel of image data is equal to 1 and each filter weighting value associated with a non-first pixel of image data within the predefined neighborhood of pixels is equal to 0. The system also includes a filter circuit to filter, using the modified set of filter weighting values, each pixel of image data within the predefined neighborhood of pixels, to generate a filtered image value for each pixel of image data within the predefined neighborhood of pixels and to sum all filtered image values for the predefined neighborhood of pixels to produce an image data sum value an image data value for the first pixel of contone image data.

Another aspect of a system that extends edge-tagged pixels of image data to pixels of contone image data includes a filter weight modifier circuit to determine a tagged state value of each pixel of image data within a predefined neighborhood of pixels, each pixel of image data within the predefined neighborhood of pixels having an associated image value, a first pixel of image data within the predefined neighborhood of pixels being associated a first pixel of contone image data. The filter weight modifier circuit determines a sum, S, of all filter weighting values within the predetermined set of filter weighting values associated with pixels of image data within the predefined neighborhood of pixels having a tagged state value indicating that the pixel of image data is a non-edge pixel. The filter weight modifier circuit modifies, when the tagged state value of the first pixel of image data indicates the first pixel of image data is a non-edge pixel, a predetermined set of filter weighting values wherein each pixel of image data within the predefined neighborhood of pixels has an associated filter weighting value, such that each filter weighting value associated with pixels of image data within the predefined neighborhood of pixels having a tagged state value indicating that the pixel of image data is a non-edge pixel is equal to a product of the predetermined filter weighting value and 1/S and each filter weighting value associated with pixels of image data within the predefined neighborhood of pixels having a tagged state value indicating that the pixel of image data is an edge pixel is equal to 0. The filter weight modifier circuit modifies, when the tagged state value of the first pixel of image data indicates the first pixel of image data is an edge pixel, the predetermined set of filter weighting values such that the filter weighting value associated with the first pixel of image data is equal to 1 and each filter weighting value associated with a non-first pixel of image data within the predefined neighborhood of pixels is equal to 0. The system also includes a filter circuit to filter, using the modified set of filter weighting values, each pixel of image data within the predefined neighborhood of pixels, to generate a filtered image value for each pixel of image data within the predefined neighborhood of pixels and to sum all filtered image values for the predefined neighborhood of pixels to produce an image data sum value as an image data value for the first pixel of contone image data.

Another aspect of a system that extends edge-tagged pixels of image data to pixels of contone image data includes a filter weight modifier circuit to determine a tagged state value of each pixel of image data within a predefined neighborhood of pixels, each pixel of image data within the predefined neighborhood of pixels having an associated image value, a first pixel of image data within the predefined neighborhood of pixels being associated a first pixel of contone image data. The filter weight modifier circuit determines a number, N, pixels of image data within the predefined neighborhood of pixels having a tagged state value indicating that the pixel of image data is a non-edge pixel. The filter weight modifier circuit modifies, when the tagged state value of the first pixel of image data indicates the first pixel of image data is a non-edge pixel, a predetermined set of filter weighting values wherein each pixel of image data within the predefined neighborhood of pixels has an associated filter weighting value, such that each filter weighting value associated with pixels of image data within the predefined neighborhood of pixels having a tagged state value indicating that the pixel of image data is a non-edge pixel is equal to 1/N and each filter weighting value associated with pixels of image data within the predefined neighborhood of pixels having a tagged state value indicating that the pixel of image data is an edge pixel is equal to 0. The filter weight modifier circuit modifies, when the tagged state value of the first pixel of image data indicates the first pixel of image data is an edge pixel, the predetermined set of filter weighting values such that the filter weighting value associated with the first pixel of image data is equal to 1 and each filter weighting value associated with a non-first pixel of image data within the predefined neighborhood of pixels is equal to 0. The system also includes a filter circuit to filter, using the modified set of filter weighting values, each pixel of image data within the predefined neighborhood of pixels, to generate a filtered image value for each pixel of image data within the predefined neighborhood of pixels and to sum, only filter weighting values that are associated with pixels within the predefined neighborhood of pixels having an image value indicating a non-zero intensity value, to produce an image data sum value as an image data value for the first pixel of contone image data.

Another aspect of a system that extends edge-tagged pixels of image data to pixels of contone image data includes a filter weight modifier circuit to determine a tagged state value of each pixel of image data within a predefined neighborhood of pixels, each pixel of image data within the predefined neighborhood of pixels having an associated image value, a first pixel of image data within the predefined neighborhood of pixels being associated a first pixel of contone image data. The filter weight modifier circuit determines a sum, S, of all filter weighting values within the predetermined set of filter weighting values associated with pixels of image data within the predefined neighborhood of pixels having a tagged state value indicating that the pixel of image data is a non-edge pixel. The filter weight modifier circuit modifies, when the tagged state value of the first pixel of image data indicates the first pixel of image data is a non-edge pixel, a predetermined set of filter weighting values wherein each pixel of image data within the predefined neighborhood of pixels has an associated filter weighting value, such that each filter weighting value associated with pixels of image data within the predefined neighborhood of pixels having a tagged state value indicating that the pixel of image data is a non-edge pixel is equal to a product of the predetermined filter weighting value and 1/S and each filter weighting value associated with pixels of image data within the predefined neighborhood of pixels having a tagged state value indicating that the pixel of image data is an edge pixel is equal to 0. The filter weight modifier circuit modifies, when the tagged state value of the first pixel of image data indicates the first pixel of image data is an edge pixel, the predetermined set of filter weighting values such that the filter weighting value associated with the first pixel of image data is equal to 1 and each filter weighting value associated with a non-first pixel of image data within the predefined neighborhood of pixels is equal to 0. The system also includes a filter circuit to filter, using the modified set of filter weighting values, each pixel of image data within the predefined neighborhood of pixels, to generate a filtered image value for each pixel of image data within the predefined neighborhood of pixels and to sum, only filter weighting values that are associated with pixels within the predefined neighborhood of pixels having an image value indicating a non-zero intensity value, to produce an image data sum value as an image data value for the first pixel of contone image data.

BRIEF DESCRIPTION OF THE DRAWING

The drawings are only for purposes of illustrating various embodiments and are not to be construed as limiting, wherein.

DETAILED DESCRIPTION

Figure 1:
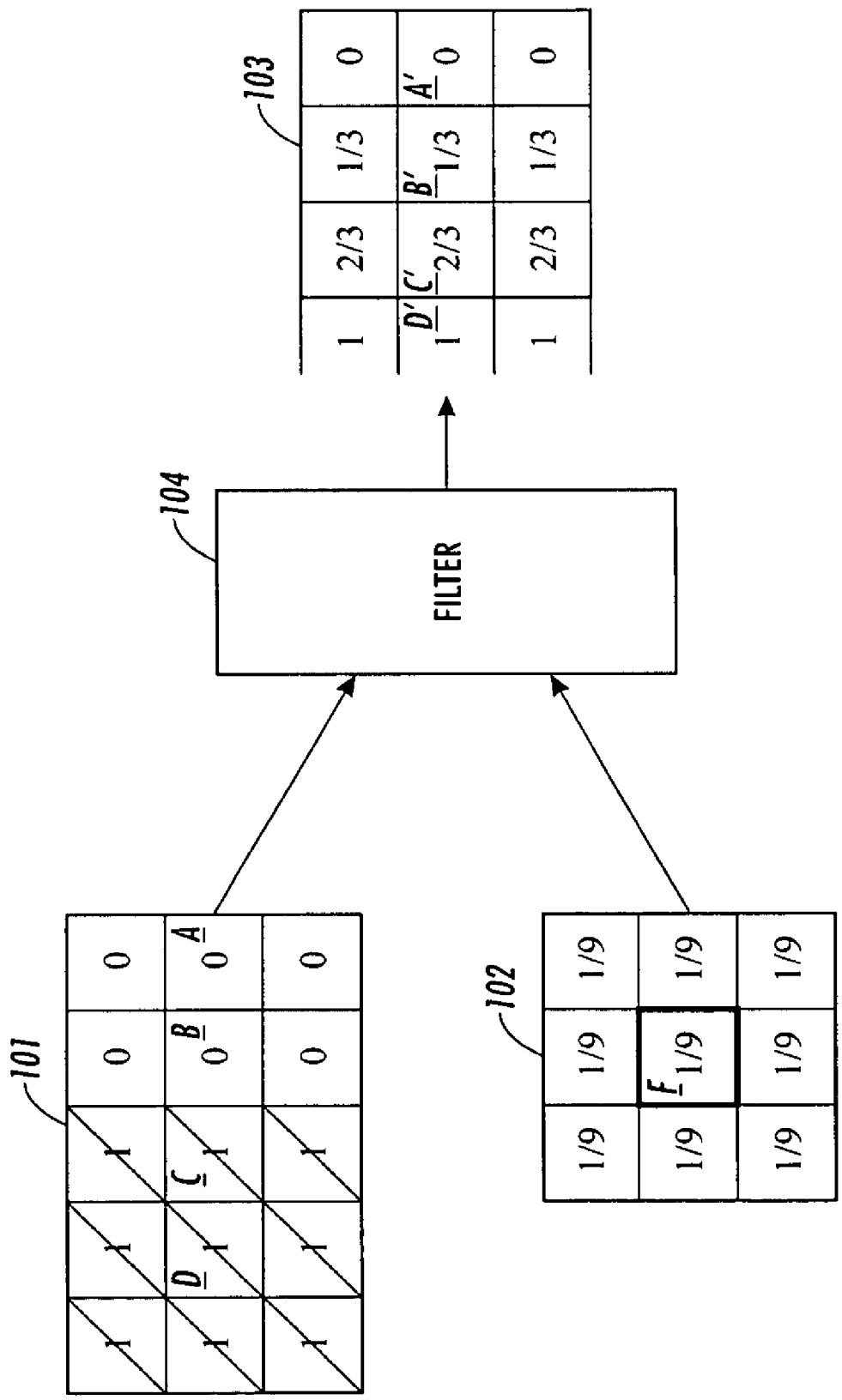
FIG. 1 shows a graphical representation of a conventional digital filtering reconstruction of a multi-valued image from a binary image.
Figure 2:
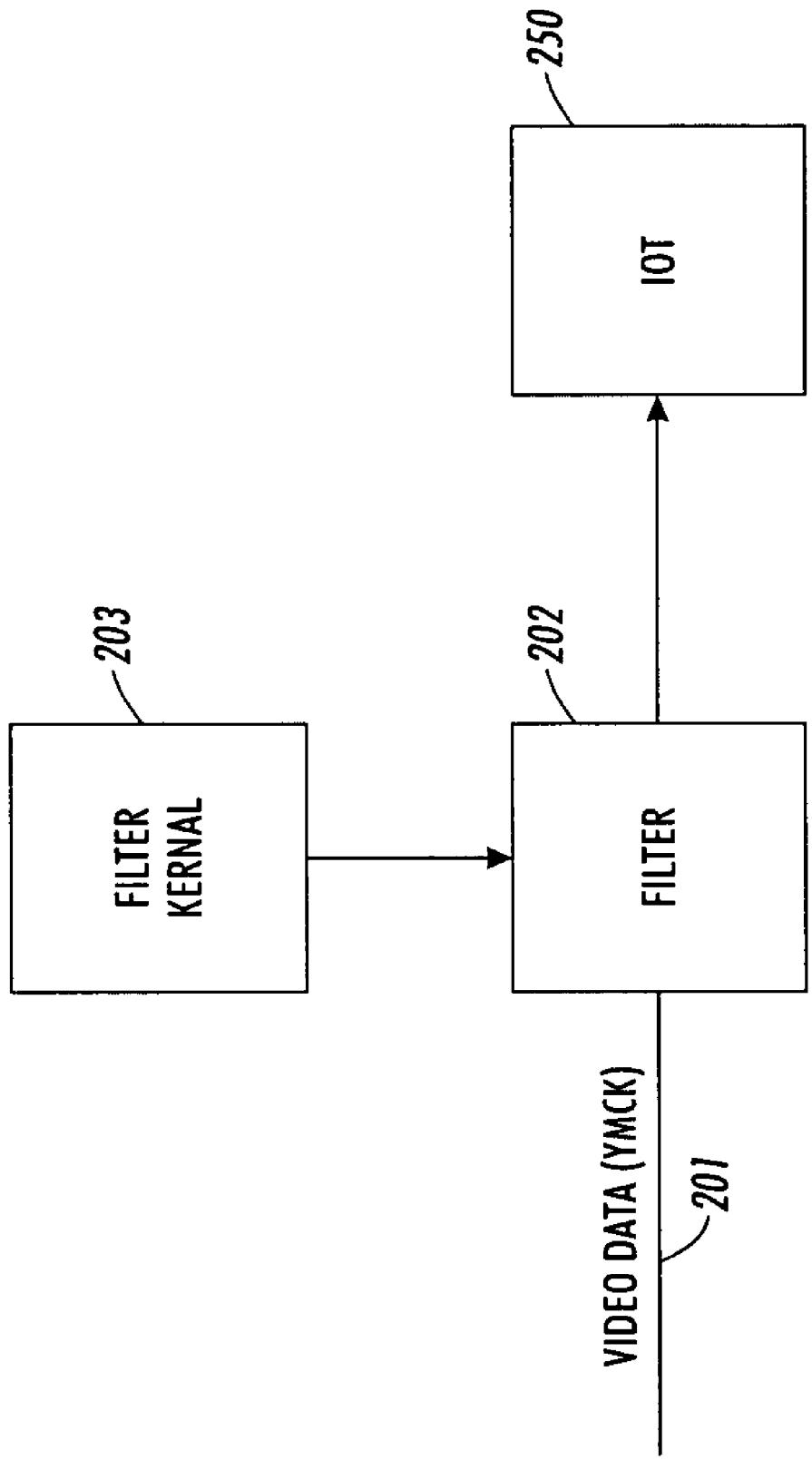
FIG. 2 shows a block diagram of a conventional digital filtering process.
Figure 3:
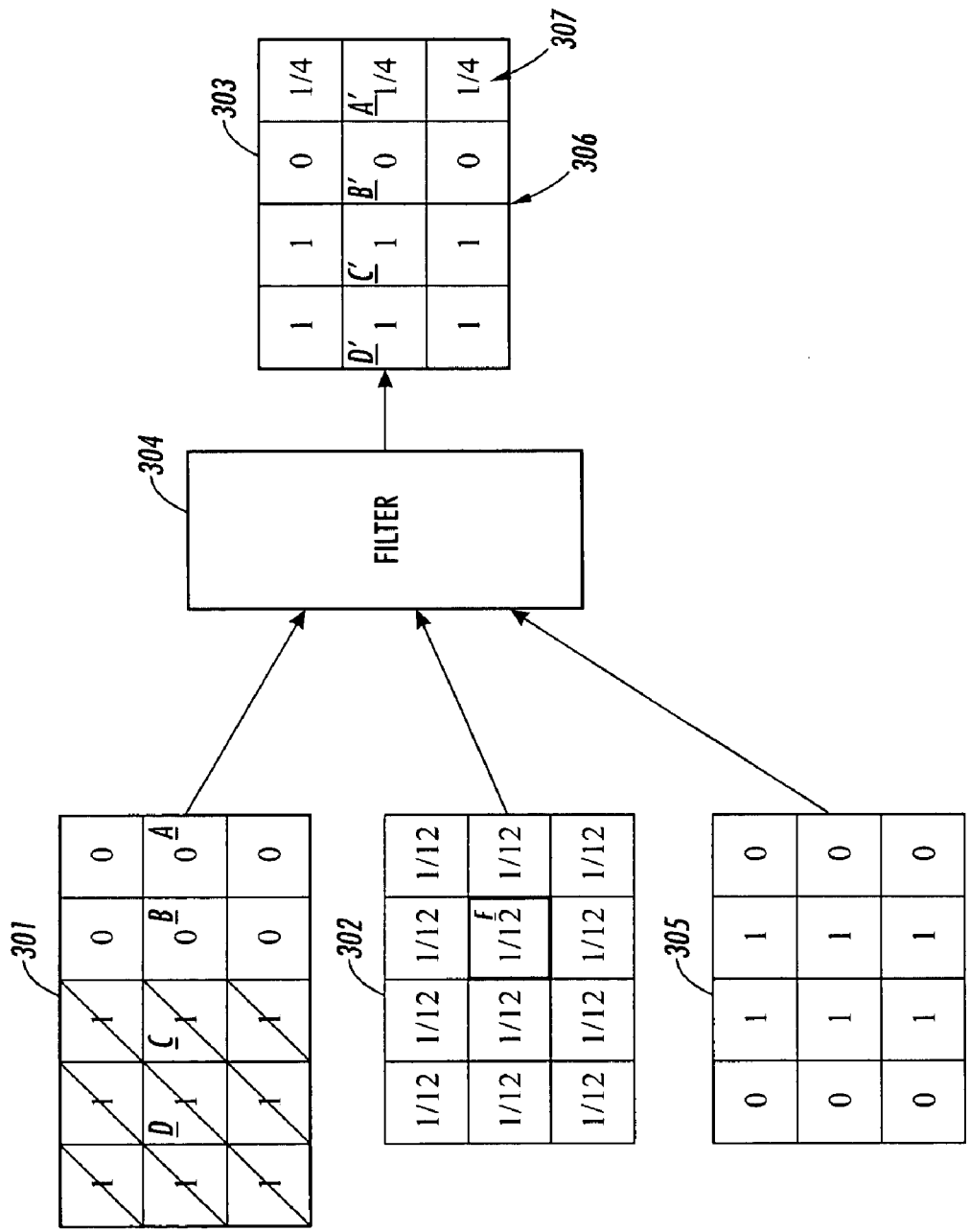
FIG. 3 shows a graphical representation of another conventional further modified digital filtering reconstruction that uses tag data to identify edges.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

In describing a method for reconstructing an analog image from a high resolution binary representation of an original object, the following description assumes that the high resolution binary image is accompanied by a parallel image wherein each pixel of the binary image is matched with a bit, called a "tag bit" that indicates whether the bit in the image represents a pixel at a density edge in the original image. The methods for determining how a tag bit is generated are conventional and well known to those skilled in the art. Such methods include matching some region of the image against a set of patterns that are indicative of sharp density edges in the original, or alternatively by applying some sort of digital filter which is more sensitive to high frequency information in the original object. As mentioned above and which teachings have been incorporated herein, U.S. Pat. No. 6,130,966 describes, in detail, one such implementation of this tagging process. Therefore, since the methodology for generating tag bits is well known, a detailed description of the creation of the tag bit will not be provided herein.

In the conventional process of reconstructing an analog image from a binary image, the binary image is filtered using a matrix of pixels centered on the pixel being reconstructed. The matrix is usually square, although it may be rectangular or other shape. The values in this matrix are chosen to provide a digital filtering function when the pixels of the image are convoluted with the filter matrix. Such processes are well known to those familiar with the art and will not be further described here. The equations governing this reconstruction are given by:

$$t_x = \sum_i \sum_j x_{ij} * f_{ij}$$

where $t_x$ is the output pixel, $x_{ij}$ is the input binary pixel at location (i,j) relative to the pixel under test, $f_{ij}$ are the filter weights, and the summation is over all the pixels in the filter window.

If such is a filter is applied, the resulting output is an analog reconstruction of the original image. If the binary representation is of high enough resolution, the analog image is a close reproduction of the original image and there will be few or no visible artifacts.

However, as noted above, the process of reconstruction will tend to soften edges. An edge is defined as a portion of the original image that has a rapid transition from high to low density or from low to high density. The softening problem may have the tendency of reducing the rapidity of such transitions. The visual effect of such edges is an apparent blur. This distortion is particularly objectionable in those areas of the original where text or line art is present. Text images depend on sharp edges at the edges of the characters to increase the ability of the reader to quickly distinguish different letter shapes.

Figure 7:
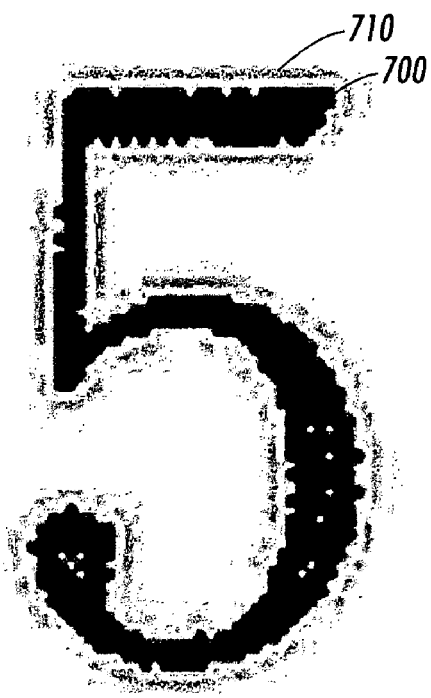
FIG. 7 illustrates an example of an image, having a ghost artifact, generated using conventional digital filtering reconstruction processes.

Thus, as noted above, it is desirable to substantially eliminate the ghost image artifact 710 of FIG. 7. This can be realized by modifying the filtering process to exclude any pixels that are tagged as edges from the filtering process. By excluding any pixels that are tagged as edges from the filtering process, the output 800 will be free of the artifacts shown in FIG. 8. The actual process of modifying the filtering process to exclude any pixels that are tagged as edges from the filtering process will be explained below in more detail.

Figure 5:
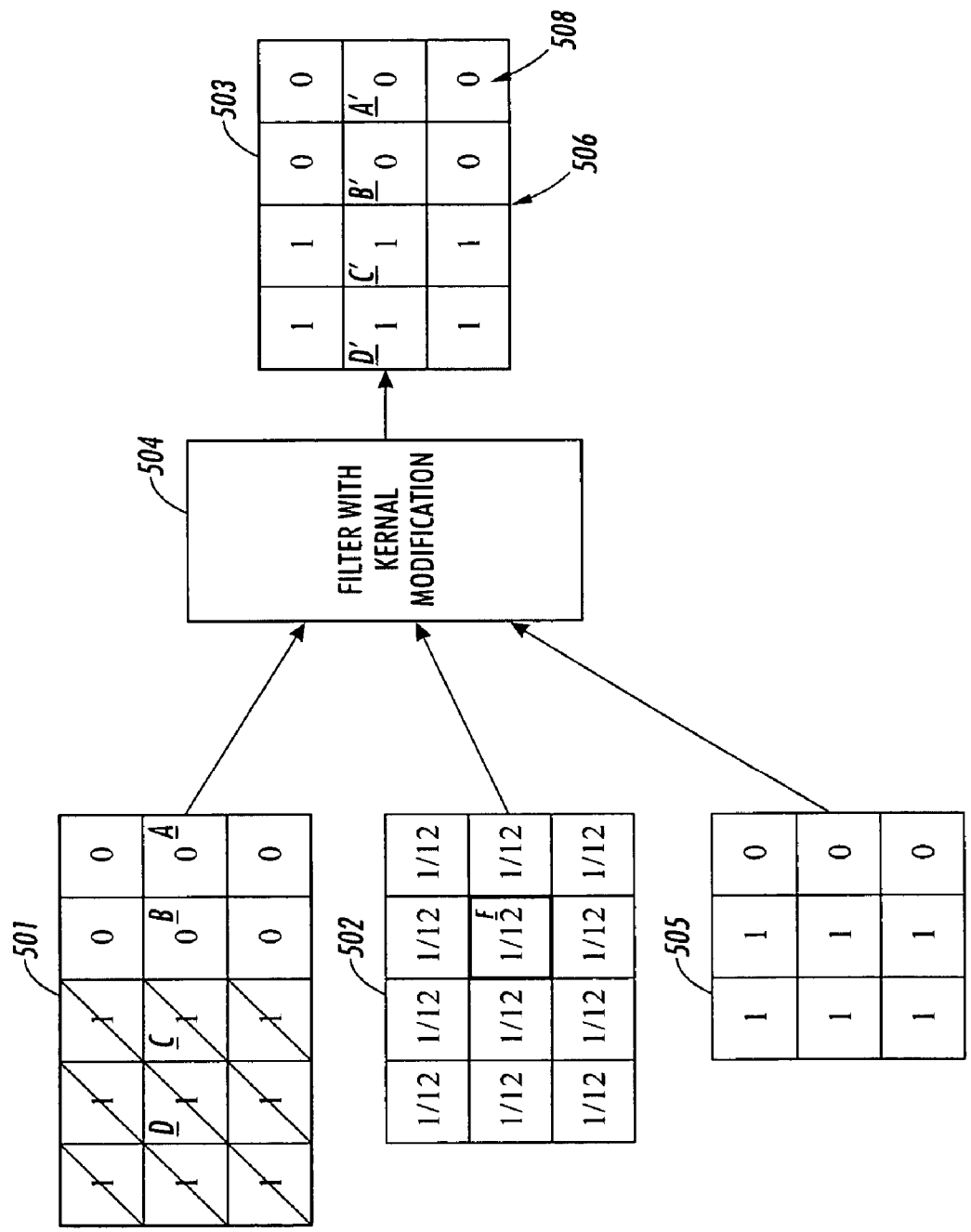
FIG. 5 shows a graphical representation of a digital filtering process that eliminates edge artifacts.

FIG. 5 shows an example of modifying the filtering process to exclude any pixels that are tagged as edges from the filtering process.

In FIG. 5, a portion of an image 501, in the form of a matrix, is shown. In the portion of the image 501, a vertical edge transitioning from black to white is shown, whereby a black region, represented by the numeric binary values "1" and slashed boxes, occupies the leftmost vertical column, and a white region, represented by the numeric binary values "0" and non-slashed boxes, occupies the center and rightmost vertical columns of the portion of the image 501. A filter kernel 502 provide a simple matrix of filter weights wherein an output pixel is the evenly weighted average of the nine pixels covered by the filter kernel 502. After a filter 504 performs the filtering operation, a portion of a output image 503 is generated.

The portion of the output image 503, as illustrated in FIG. 5, demonstrates that the original sharp edge of the portion of the image 501 has been converted to a sharp edge 506 with no ghost image artifact 508. More specifically, the original edge of the portion of the image 501 made the transition from "1" to "0" in a width of a single pixel. On the other hand, the filtered edge 506 of the portion of the output image 503 has a transition 506 from "1" to "0" being a width of a single pixel and no ghost artifact 508.

In other words, when the pixel A of the portion of the image 501 of FIG. 5 is processed by the filter 504, the output pixel A' of the portion of the output image 503 has a value of "0" indicating, in this example, no ghost artifact 508, assuming that the column to the right of the rightmost illustrated column contained only "0" values. It is noted that the pixel of interest has a filter position that is associated with the highlighted pixel position F. The output value of output pixel A' of the portion of the output image 503 has a value of "0" because the pixels associated with the column of the portion of the image 501 associated with the pixel C of the portion of the image 501 were tagged as being edge pixels. Due to the pixels being tagged as edge pixels, the values associated with the pixels are not included in the filtering process. The filtering process is utilized because the pixel in question, the pixel A of the portion of the image 501, is not tagged as an edge. But since the filtering process would normally process edge associated pixels, the particular edge pixel values are individually excluded from the filtering process.

Moreover, when the pixel B of the portion of the image 501 is processed by the filter 504, the output pixel B' of the portion of the output image 503 has a value of "0" indicating, in this example, a white region because pixel B of the portion of the image 501 had been tagged as an edge, and thus, the filter value for the pixel B of the portion of the image 501 is not selected as the output value for output pixel B' of the portion of the output image 503, but the actual value of pixel B of the portion of the image 501 is passed through as the output pixel B' of the portion of the output image 503.

Furthermore, when the pixel C of the portion of the image 501 is processed by the filter 504, the output pixel C' of the portion of the output image 503 has a value of "1" indicating, in this example, a black region because pixel C of the portion of the image 501 had been tagged as an edge, and thus, the filter value for the pixel C of the portion of the image 501 is not selected as the output value for output pixel C' of the portion of the output image 503, but the actual value of pixel C of the portion of the image 501 is passed through as the output pixel C' of the portion of the output image 503.

Lastly, when the two columns to the left of the leftmost illustrated column contain only "1" values and the center pixel D of the portion of the image 501 is processed by the filter 504, the resulting output pixel D' of the portion of the output image 503 has a value of "1" indicating, in this example, a black region because pixel D of the portion of the image 501 had not been tagged as an edge, and thus, the filter value for the pixel D of the portion of the image 501 is selected as the output value for output pixel D' of the portion of the output image 503.

Figure 6:
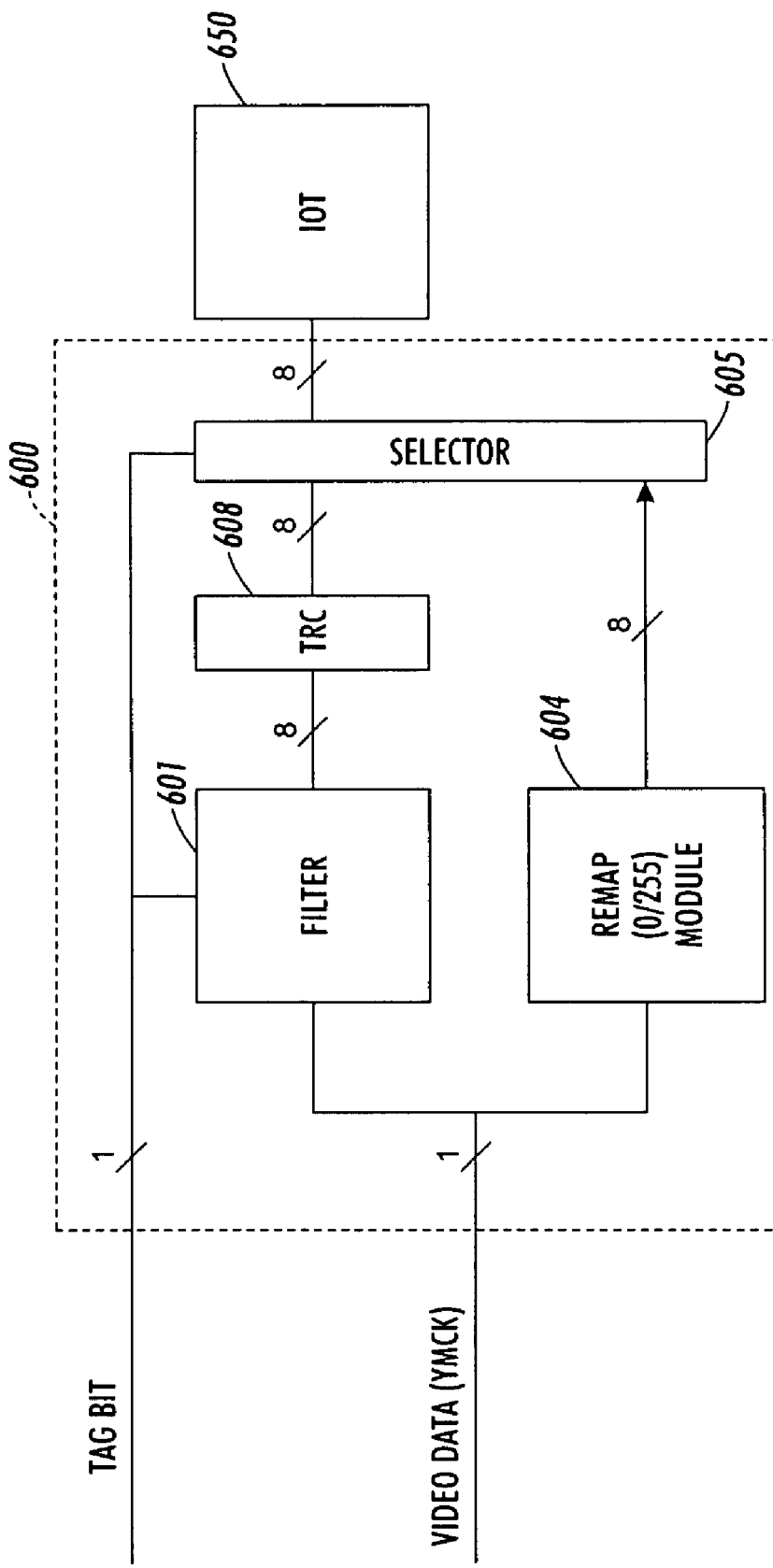
FIG. 6 shows a block diagram of a system utilizing the process of FIG. 5 and incorporating a tonal reproduction curve module.

FIG. 6 shows a block diagram of a device to implement the process illustrated in FIG. 5 and described above. As illustrated in FIG. 6, image data is sent to two modules. The first module, a digital filter module 601 accepts the image and tag data and digitally filters the image data. The second module, a Remap "255/0" module 604, outputs either 255 (all 8 bits ON) or 0 (all 8 bits OFF) depending on whether the input pixel has a value of "1" or "0." The output of these two modules is sent to a selector module 605. The output of the selector module 605, which is controlled by the tag data stream, is sent to an image output terminal (IOT) 650, which converts the image data to a hard copy of the image. If the tag bit is 1, the selector output is identical to the Remap "255/0" module 604, and if the tag bit is 0, the selector output is identical to the output of the digital filter module 601.

Figure 4:
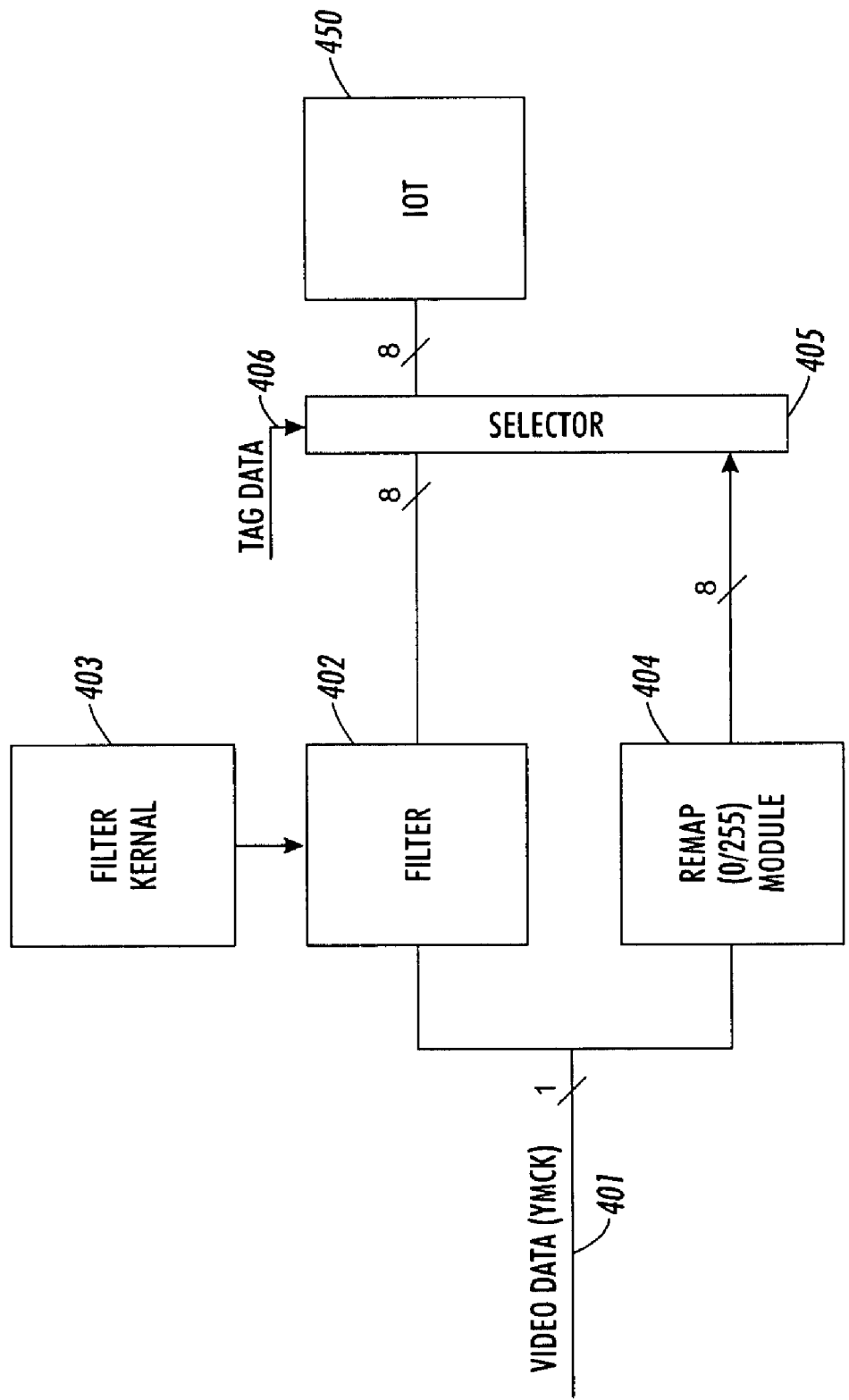
FIG. 4 shows a block diagram of another conventional digital filtering process that uses tag data.

While the elements of FIG. 6 are essentially the same as in FIG. 4, the digital filter module 601 is modified to include an input from the tag data stream as well as the image stream. The filtering process of FIG. 6 requires that any edge pixel inside of the filter window is not included in the averaging process. By doing so, the edge pixels that are near the pixel under consideration are excluded from the averaging process. This essentially eliminates the edge artifacts from the reconstructed image.

Figure 8:
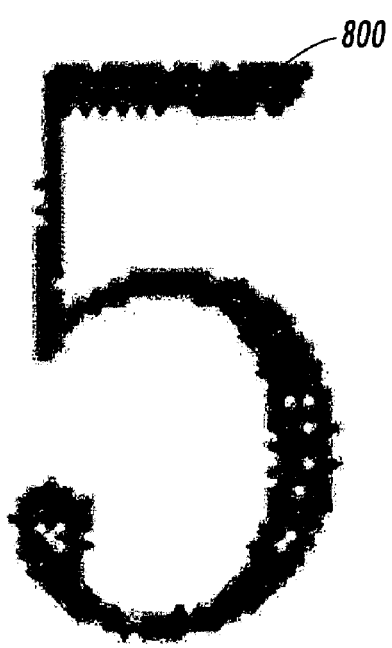
FIG. 8 illustrates an image, having no ghost artifact, generated using the digital filtering process of FIG. 5.

The implementation of FIG. 6 can be described by the following logical equation:

$$t_x = \sum_i \sum_j x_{ij} * f_{ij} * w'_{ij}$$

Where the $t_x$, $x_{ij}$ and $f_{ij}$ are as before, but $w'_{ij}$ is a weight value determined by the tag matrix. If pixel ij in the tag matrix is 1, indicating that the pixel is an edge pixel, $w_{ij}$ is zero and the corresponding pixel in the binary image is not included in the output summation. In a different embodiment, if pixel ij in the tag matrix is 1, indicating that the pixel is an edge pixel, $w_{ij}$ is zero and the other weight coefficients may be modified to ensure that the remaining non-zero coefficients, when summed, equal a predetermined filter kernel matrix value. In a further embodiment, if pixel ij in the tag matrix is 1, indicating that the pixel is an edge pixel, $w_{ij}$ is zero and the other weight coefficients may be modified to ensure that the remaining non-zero coefficients, when summed, equal a predetermined filter kernel matrix value of one. In these further embodiments, the coefficients or weights of the filter kernel associated with the remaining non-zero coefficients or weights are further modified to normalize the filter kernel matrix value. FIG. 8 shows the effect of eliminating the edge pixels that are in the filter window, but are not the pixel under consideration.

As noted above, several additional features may be added to this system as alternatives. For example, the digital filter kernel is usually implemented so that the sum of the weights or coefficients in the filter matrix is normalized to 1. It is noted that the process may choose to re-normalize the filter matrix on the fly to take into account those weights or coefficients that are not used because the weights or coefficients coincide with tagged pixels. A way to implement this is to add an additional element to the module of FIG. 4.

FIG. 6 further shows a tonal reproduction curve circuit 608, which performs a tonal reproduction curve operation on the output of the digital filter 601. This tonal reproduction curve ("TRC") circuit 608 performs a simple table lookup operation to transform the output of the digital filter 601 to a new set of values that are consistent with the filter operation. It may consist of a plurality of tables that are selected by a signal from the digital filter 601. The signal may be computed by the digital filter 601 as a function of the number of filter elements that are eliminated by ignoring tagged pixels. The signal may also be based on the number of eliminated pixels, or by a more complex computation that renormalizes the filter kernel based on the weights or coefficients of the pixels that are not counted.

The TRC circuit may also function as a normal TRC circuit in that the tonal reproduction curve may be based on factors that are independent of the filter operations. For example, the tonal reproduction curve could compensate for the response of the image output terminal or print engine. The tonal reproduction curve could be calculated based on the image content and a desire to normalize the tone response curve of the system. Finally, the tonal reproduction curve can also be altered in response to user input, for example, to change the contrast or lightness/darkness of the output image. Of course, any of these tonal reproduction curves can be concatenated with a tonal reproduction curve to compensate for the filtering operations to give a single tonal reproduction curve that accomplishes all of these goals.

As noted above, the tag bit can be used to determine whether to apply the filter or not, but the tag bit can also be used for each individual pixel location to determine whether to use that pixel in the sum of the filtered pixels. This has the effect of eliminating ghosting around text on the output image.

Figure 9:
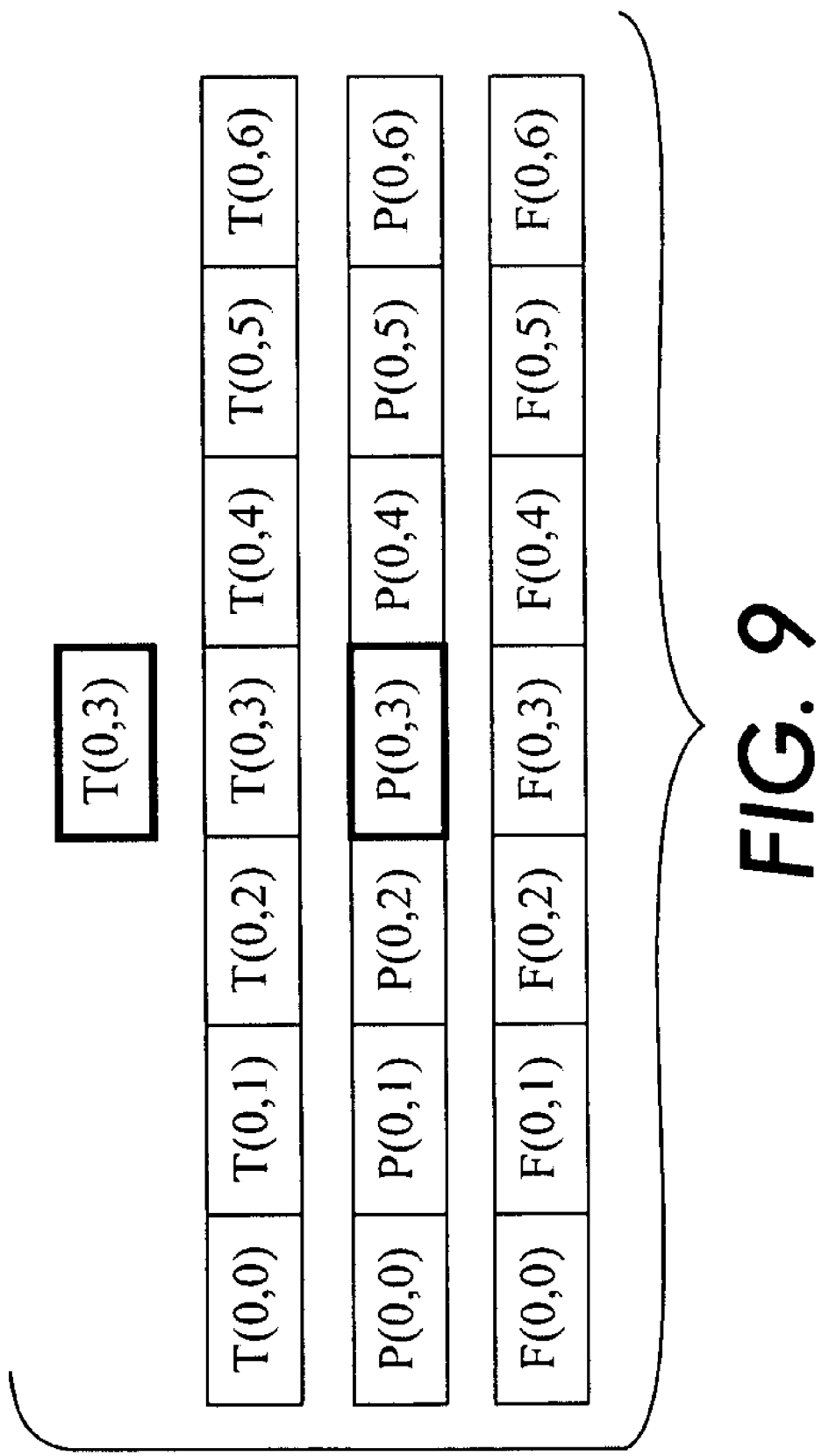
FIG. 9 illustrates an one-dimensional graphical representation of a digital filtering process that eliminates edge artifacts.

FIG. 9 provides another illustration of using the tag bit as part of the filtering operation to determine whether to include the individual pixels in the filtered total. Moreover, although the filtering process is typically a 2-dimensional process, FIG. 9 utilizes a 1-dimensional example for simplicity. In this example, the process is a binary data extended to contone process As illustrated in FIG. 9, the binary data extended to contone process is a filtering process utilizing a standard convolution operation upon an input pixel value P(0,3) to realize an output pixel value P'(0,3). As noted above, with respect to the conventional process, if the pixel P(0,3) is not tagged, namely T(0,3) is equal to zero, the output pixel value for P'(0,3) is the summation of the products $(P_{ij})(F_{ij})$. On the other hand, if the pixel P(0,3) is tagged, namely T(0,3) is equal to one, the output pixel value for P'(0,3) is equal to P(0,3).

With respect to a binary data extended to contone process that eliminates ghost artifacts, one embodiment, utilizing the illustration of FIG. 9, may operate as follows.

If the pixel P(0,3) is not tagged, namely T(0,3) is equal to zero, the output pixel value for P'(0,3) is the summation of the products $(P_{ij})(F_{ij})$ wherein, $(P_{ij})(F_{ij})$ is only calculated when the value of T(i,j) equals zero. If the value of T(i,j) equals one, $(P_{ij})(F_{ij})$ is either eliminated from the overall summation or set to a zero value. On the other hand, if the pixel P(0,3) is tagged, namely T(0,3) is equal to one, the output pixel value for P'(0,3) is equal to P(0,3).

With respect to a binary data extended to contone process that eliminates ghost artifacts, another embodiment, utilizing the illustration of FIG. 9, may operate as follows.

If the pixel P(0,3) is not tagged, namely T(0,3) is equal to zero, the output pixel value for P'(0,3) is the summation of the components of $(F_{ij})$ when both the value of T(i,j) equals zero and the value of P(i,j) is equal to one. If the value of T(i,j) equals one or the value of P(i,j) is not equal to one, $(F_{ij})$ is either eliminated from the overall summation or set to a zero value. On the other hand, if the pixel P(0,3) is tagged, namely T(0,3) is equal to one, the output pixel value for P'(0,3) is equal to P(0,3).

Figure 10:
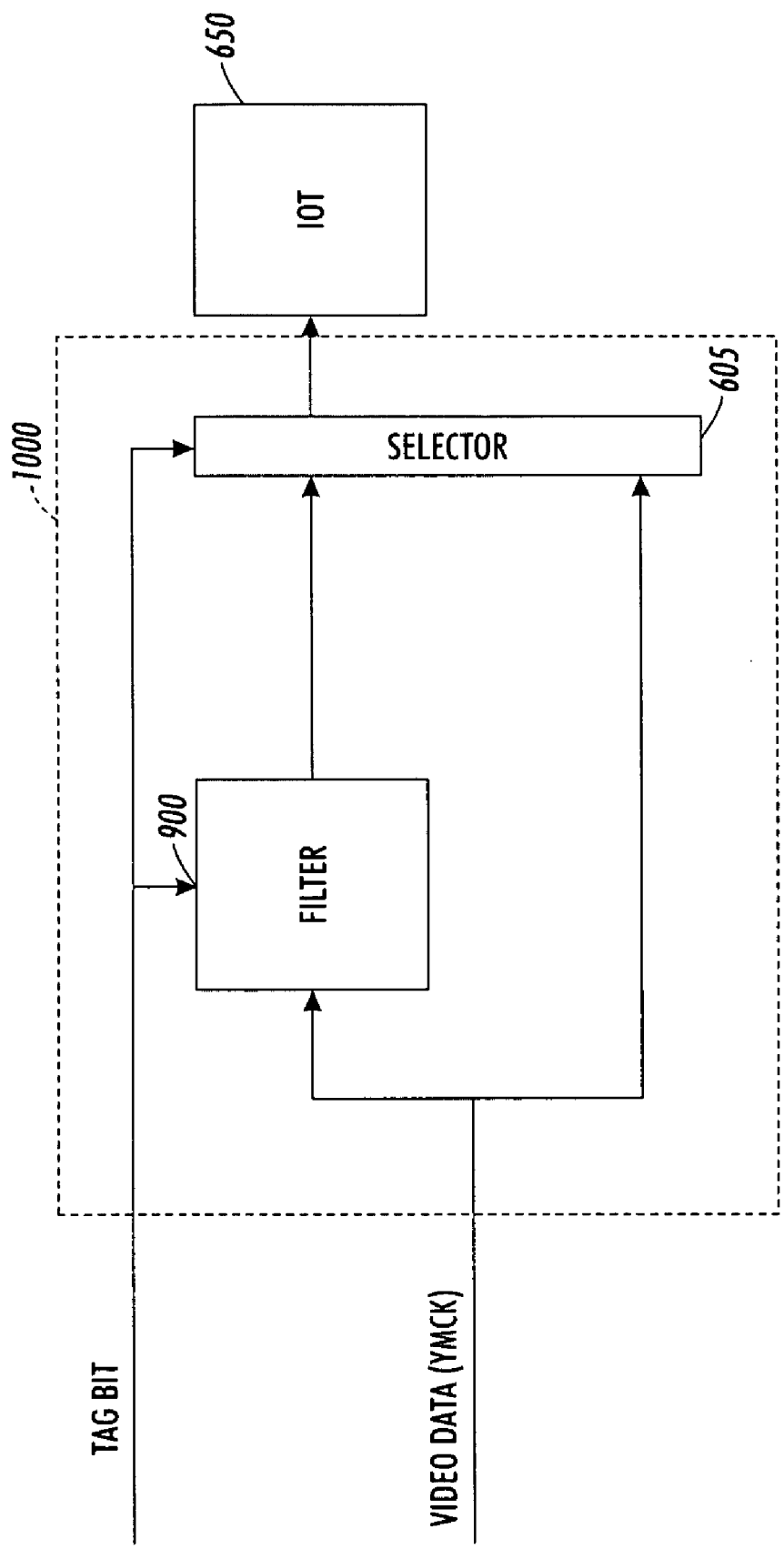
FIG. 10 shows a block diagram of a system utilizing a digital filtering process that eliminates edge artifacts.

FIG. 10 illustrates a system for converting edge-tagged pixels of image data to pixels of contone image data. As illustrated in FIG. 10, a filter 900 receives both image data and the tag bits. The filter 900 determine a tagged state value of each pixel of image data within a predefined neighborhood of pixels wherein each pixel of image data within the predefined neighborhood of pixels has an associated image value and a first pixel of image data within the predefined neighborhood of pixels is associated a first pixel of contone image data. The filter 900 filters, using a predetermined set of filter weighting values wherein each pixel of image data within the predefined neighborhood of pixels has an associated filter weighting value, each image value of each pixel of image data within the predefined neighborhood of pixels having a tagged state value indicating that the pixel of image data is a non-edge pixel to generate a filtered image value for each pixel of image data within the predefined neighborhood of pixels having a tagged state value indicating that the pixel of image data is a non-edge pixel; assigns, a predetermined filtered image value to each pixel of image data within the predefined neighborhood of pixels having a tagged state value indicating that the pixel of image data is an edge pixel; and sums all filtered image values for the predefined neighborhood of pixels to produce an image data sum value. Based on the tag value for the first pixel of image data within the predefined neighborhood of pixels, a selector 605 either allows, when the tagged state value of the first pixel of image data indicates the first pixel of image data is a non-edge pixel, the image data sum value to be assigned as an image data value for the first pixel of contone image data or the image data value of the first pixel of image data to be assigned as an image data value for the first pixel of contone image data. It is noted that the predetermined filtered image value may be zero. This process can be utilized when each pixel of image data within the predefined neighborhood of pixels has an associated binary image value.

Figure 11:
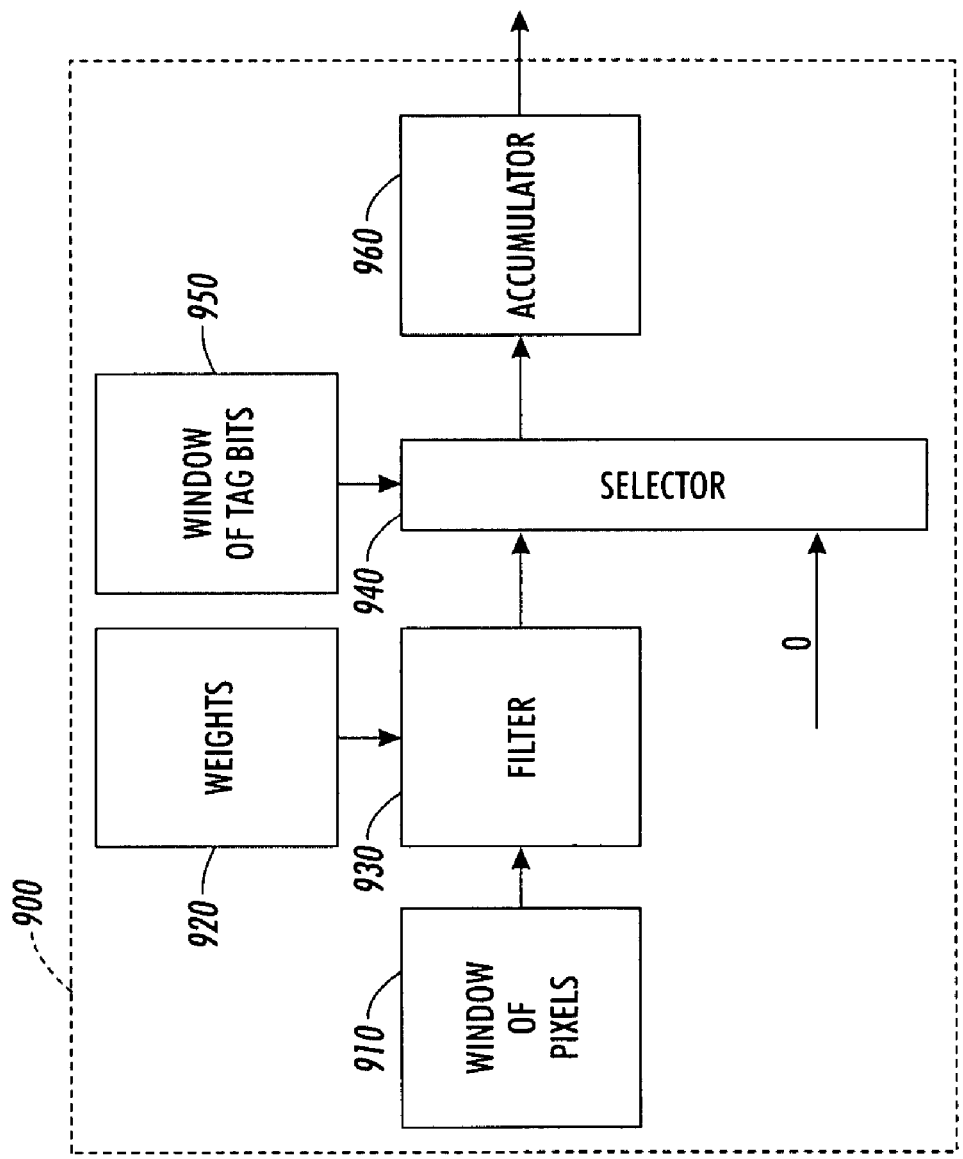
FIG. 11 shows a block diagram of a system utilizing a digital filtering process that eliminates edge artifacts.

FIG. 11 illustrates a filter circuit configuration that enables the converting of edge-tagged pixels of image data to pixels of contone image data. As illustrated in FIG. 10, a filter 900 includes a buffer 910 for storing a window of pixels. This window of pixels may be a two-dimensional matrix of image data. The image data within the buffer 910 is fed to a filter 930. The filter 930 also receives filter weights values from a filter weights buffer or memory 920.

Upon receiving the image data and the filter weights, the filter 930 multiplies each image data value with the associated filter weight value. The product is received by selector 940. Selector 940 selects between the product from filter 930 and a zero value based upon tag bit data received from a tag bit buffer or memory 950. More specifically, when the pixel associated with the product is tagged as a non-edge pixel, the selector 940 selects the product from filter 930. When the pixel associated with the product is tagged as an edge pixel, the selector 940 selects the zero value. The selected value is received by accumulator 960 which generates the non-edge image data value for the contone image.

Figure 12:
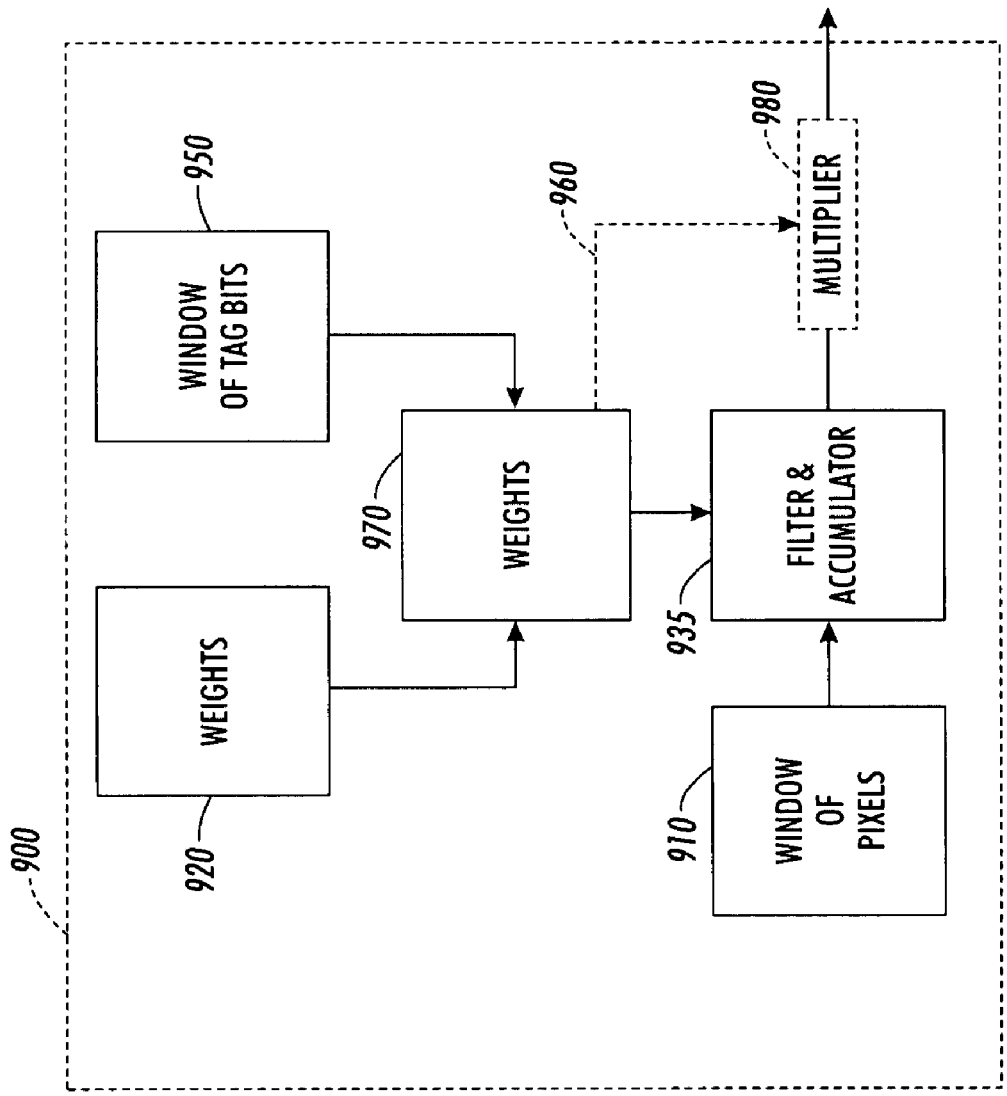
FIG. 12 shows a block diagram of a system utilizing a digital filtering process that eliminates edge artifacts.

FIG. 12 illustrates another filter circuit configuration that enables the converting of edge-tagged pixels of image data to pixels of contone image data. As illustrated in FIG. 11, a filter 900 includes a buffer 910 for storing a window of pixels. This window of pixels may be a two-dimensional matrix of image data. The image data within the buffer 910 is fed to a filter & accumulator 935. The filter & accumulator 935 also receives filter weights values from a filter weights modifier circuit 970.

Upon receiving the image data and the filter weights, the filter & accumulator 935 multiplies each image data value with the associated filter weight value. The product is the generated non-edge image data value for the contone image.

As further illustrated in FIG. 12, the filter weights modifier circuit 970 receives filter weights values from a filter weights buffer or memory 920 and tag bit data from a tag bit buffer or memory 950. The filter weights modifier circuit 970 utilizes this data, in a variety of ways to create a matrix of modified filter weight values to be utilized by the filter & accumulator 935.

For example, the filter weights modifier circuit 970 determines a tagged state value of each pixel of image data within a predefined neighborhood of pixels and a number, N, pixels of image data within the predefined neighborhood of pixels having a tagged state value indicating that the pixel of image data is a non-edge pixel. In this example, the filter weights modifier circuit 970 modifies, when the tagged state value of the first pixel of image data indicates the first pixel of image data is a non-edge pixel, a predetermined set of filter weighting values wherein each pixel of image data within the predefined neighborhood of pixels has an associated filter weighting value, such that each filter weighting value associated with pixels of image data within the predefined neighborhood of pixels having a tagged state value indicating that the pixel of image data is a non-edge pixel is equal to 1/N and each filter weighting value associated with pixels of image data within the predefined neighborhood of pixels having a tagged state value indicating that the pixel of image data is an edge pixel is equal to 0.

The filter weights modifier circuit 970 may also modify, when the tagged state value of the first pixel of image data indicates the first pixel of image data is an edge pixel, the predetermined set of filter weighting values such that the filter weighting value associated with the first pixel of image data is equal to 1 and each filter weighting value associated with a non-first pixel of image data within the predefined neighborhood of pixels is equal to 0.

In another example, the filter weights modifier circuit 970 determines a tagged state value of each pixel of image data within a predefined neighborhood of pixels and a sum, S, of all filter weighting values within the predetermined set of filter weighting values associated with pixels of image data within the predefined neighborhood of pixels having a tagged state value indicating that the pixel of image data is a non-edge pixel. In this example, the filter weights modifier circuit 970 modifies, when the tagged state value of the first pixel of image data indicates the first pixel of image data is a non-edge pixel, a predetermined set of filter weighting values wherein each pixel of image data within the predefined neighborhood of pixels has an associated filter weighting value, such that each filter weighting value associated with pixels of image data within the predefined neighborhood of pixels having a tagged state value indicating that the pixel of image data is a non-edge pixel is equal to a product of the predetermined filter weighting value and 1/S and each filter weighting value associated with pixels of image data within the predefined neighborhood of pixels having a tagged state value indicating that the pixel of image data is an edge pixel is equal to 0.

The filter weights modifier circuit 970 may also modify, when the tagged state value of the first pixel of image data indicates the first pixel of image data is an edge pixel, the predetermined set of filter weighting values such that the filter weighting value associated with the first pixel of image data is equal to 1 and each filter weighting value associated with a non-first pixel of image data within the predefined neighborhood of pixels is equal to 0.

Another alternative for modifying the filter weights is to use the sum of the filter weights of either the excluded pixels, or of only the included pixels, and using this value as the entry into a lookup table whose output can be a factor by which to multiply the remaining, non-excluded filter, weights, the filter weights associated with pixels having a tag value indicating a non-edge. This can be applied internally to the filter weights in element 970 of FIG. 12, or alternatively, the weight can be output, as signal 960, from the weights modifier element 970 and applied as an input to a multiplier element 980 where it multiplies the output of the digital filter.

More specifically, filter weights modifier circuit 970 may produce a sum of predetermined filter weights for pixels of image data within the predefined neighborhood of pixels having a tagged state value indicating that the pixel of image data is a non-edge pixel. The filter weights modifier circuit 970 then may apply the sum as an input to a lookup table and use an output of the lookup table, corresponding to inputted sum, to modify the predetermined filter weights for pixels of image data within the predefined neighborhood of pixels having a tagged state value indicating that the pixel of image data is a non-edge pixel.

On the other hand, filter weights modifier circuit 970 may produce a sum of predetermined filter weights for pixels of image data within the predefined neighborhood of pixels having a tagged state value indicating that the pixel of image data is an edge pixel. The filter weights modifier circuit 970 then may apply the sum as an input to a lookup table and use an output of the lookup table, corresponding to inputted sum, to modify the predetermined filter weights for pixels of image data within the predefined neighborhood of pixels having a tagged state value indicating that the pixel of image data is a non-edge pixel.

Furthermore, filter weights modifier circuit 970 may produce a sum of predetermined filter weights for pixels of image data within the predefined neighborhood of pixels having a tagged state value indicating that the pixel of image data is a non-edge pixel. The filter weights modifier circuit 970 may apply the sum as an input to a lookup table, and a multiplier may be used to multiply the image data sum value by an output value from the lookup table, corresponding to inputted sum to modify the image data sum value.

Lastly, filter weights modifier circuit 970 may produce a sum of predetermined filter weights for pixels of image data within the predefined neighborhood of pixels having a tagged state value indicating that the pixel of image data is an edge pixel. The filter weights modifier circuit 970 may apply the sum as an input to a lookup table, and a multiplier may be used to multiply the image data sum value by an output value from the lookup table, corresponding to inputted sum to modify the image data sum value.

Further, it is noted that it has been assumed in the above descriptions that a contone pixel is only eight bits in width, covering a range of values from 0 to 255, the arithmetic performed in the multiply and summation of the digital filter may be carried out with more than eight bits of precision. In fact, in may be desirable to carry out the arithmetic with a higher precision, followed by a simple shift operation to extract the eight most significant bits from the resulting product sum. Such techniques are well known in the art and contribute to improved quality of the output.

Finally, while the image reconstruction process has been illustrated in the context of a digital copying process, it will be recognized by those skilled in the art that there are other contexts in which this operation can also be applied. For example, in networked scanning application, where an image is scanned at one place and electronically transmitted elsewhere. This the binary plus tag image format can allow for a more robust reconstruction process at the receiving end of the networked scanning operation. Moreover, the image reconstruction process can be realized in software, hardware, or a combination of both.

Furthermore, while the operations described herein, are described where the tagging of the edges is done in the scanning process, it is also possible that the system could receive an untagged binary image and proceed to develop a tagged data image. Such processes are well known and are not described here. It is noted that wherever the tag image data is generated, it can be used to improve the output contone image quality.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for converting a first pixel of image data to a first pixel of contone image data, comprising:
    (a) determining, using an electronic circuit, a tagged state value for each pixel of a plurality of pixels of image data;
    (b) reconstructing, using an electronic circuit, the first pixel of image data to create reconstructed contone image data;
    (c) summing, using an electronic circuit, a plurality of tagged state value dependent weighted pixel values to create summed contone image data, each tagged state value dependent weighted pixel value corresponding to a pixel of image data within a predefined neighborhood of pixels of image data, the predefined neighborhood of pixels of image data having the first pixel of image data therein, a tagged state value dependent weighted pixel value being zero when the tagged state value of the corresponding pixel of image data indicates that the corresponding pixel of image data is an edge pixel and a tagged state value dependent weighted pixel value being equal to a product of a coefficient, a window coefficient, and a corresponding pixel value when the tagged state value of the corresponding pixel of image data indicates that the corresponding pixel of image data is a non-edge pixel, the window coefficient being equal to 1/n wherein n is a number pixels of image data within the predefined neighborhood of pixels having a tagged state value indicating that the pixel of image data is a non-edge pixel;
    (d) selecting, using an electronic circuit, when the tagged state value of the first pixel of image data indicates the first pixel of image data is a non-edge pixel, the summed contone image data as an image data value for the first pixel of contone image data; and
    (e) selecting, using an electronic circuit, when the tagged state value of the first pixel of image data indicates the first pixel of image data is an edge pixel, the reconstructed contone image data as the image data value for the first pixel of contone image data.

2. The method as claimed in claim 1, wherein each pixel of image data within the predefined neighborhood of pixels has an associated binary image value.

3. The method as claimed in claim 1, further comprising:
    performing a tonal reproduction curve operation upon the selected image data value for the first pixel of contone image data when the tagged state value of the first pixel of image data indicates the first pixel of image data is a non-edge pixel.

4. A method for converting a first pixel of image data to a first pixel of contone image data, comprising:
    (a) determining, using an electronic circuit, a tagged state value for each pixel of a plurality of pixels of image data;

(b) reconstructing, using an electronic circuit, the first pixel of image data to create reconstructed contone image data;

(c) summing, using an electronic circuit, a plurality of tagged state value dependent weighted pixel values to create summed contone image data, each tagged state value dependent weighted pixel value corresponding to a pixel of image data within a predefined neighborhood of pixels of image data, the predefined neighborhood of pixels of image data having the first pixel of image data therein, a tagged state value dependent weighted pixel value being zero when the tagged state value of the corresponding pixel of image data indicates that the corresponding pixel of image data is an edge pixel and a tagged state value dependent weighted pixel value being equal to a product of a coefficient, a non-edge window coefficient, and a corresponding pixel value when the tagged state value of the corresponding pixel of image data indicates that the corresponding pixel of image data is a non-edge pixel and each pixel position within the predefined neighborhood of pixels having a coefficient value assigned thereto, the non-edge window coefficient being a value dependent upon a sum of all coefficients within the predefined neighborhood of pixels having a tagged state value of the corresponding pixel of image data indicating that the corresponding pixel of image data is a non-edge pixel;

(d) selecting, using an electronic circuit, when the tagged state value of the first pixel of image data indicates the first pixel of image data is a non-edge pixel, the summed contone image data as an image data value for the first pixel of contone image data; and (e) selecting, using an electronic circuit, when the tagged state value of the first pixel of image data indicates the first pixel of image data is an edge pixel, the reconstructed contone image data as the image data value for the first pixel of contone image data.

5. The method as claimed in claim 4, further comprising:
performing a tonal reproduction curve operation upon the selected image data value for the first pixel of contone image data when the tagged state value of the first pixel of image data indicates the first pixel of image data is a non-edge pixel.

6. A method for converting a first pixel of image data to a first pixel of contone image data, comprising:

(a) determining, using an electronic circuit, a tagged state value for each pixel of a plurality of pixels of image data;

(b) reconstructing, using an electronic circuit, the first pixel of image data to create reconstructed contone image data;

(c) summing, using an electronic circuit, a plurality of tagged state value dependent weighted pixel values to create summed contone image data, each tagged state value dependent weighted pixel value corresponding to a pixel of image data within a predefined neighborhood of pixels of image data, the predefined neighborhood of pixels of image data having the first pixel of image data therein, a tagged state value dependent weighted pixel value being zero when the tagged state value of the corresponding pixel of image data indicates that the corresponding pixel of image data is an edge pixel and a tagged state value dependent weighted pixel value being equal to a product of a coefficient, an edge window coefficient, and a corresponding pixel value when the tagged state value of the corresponding pixel of image data indicates that the corresponding pixel of image data is a non-edge pixel and each pixel position within the predefined neighborhood of pixels having a coefficient value assigned thereto, the non-edge window coefficient being a value dependent upon a sum of all coefficients within the predefined neighborhood of pixels having a tagged state value of the corresponding pixel of image data indicating that the corresponding pixel of image data is an edge pixel;

(d) selecting, using an electronic circuit, when the tagged state value of the first pixel of image data indicates the first pixel of image data is a non-edge pixel, the summed contone image data as an image data value for the first pixel of contone image data; and (e) selecting, using an electronic circuit, when the tagged state value of the first pixel of image data indicates the first pixel of image data is an edge pixel, the reconstructed contone image data as the image data value for the first pixel of contone image data.

7. The method as claimed in claim 6, further comprising:
performing a tonal reproduction curve operation upon the selected image data value for the first pixel of contone image data when the tagged state value of the first pixel of image data indicates the first pixel of image data is a non-edge pixel.

8. A system for converting a first pixel of image data to a first pixel of contone image data, each pixel having an associated tag indicating an edge state of the pixel, comprising:

a reconstruction circuit to create reconstructed contone image data from the first pixel of image data;

a filtered summing circuit to sum a plurality of tagged state value dependent weighted pixel values to create summed contone image data, each tagged state value dependent weighted pixel value corresponding to a pixel of image data within a predefined neighborhood of pixels of image data, the predefined neighborhood of pixels of image data having the first pixel of image data therein, a tagged state value dependent weighted pixel value being zero when the tagged state value of the corresponding pixel of image data indicates that the corresponding pixel of image data is an edge pixel and a tagged state value dependent weighted pixel value being equal to a product of a coefficient, a window coefficient, and a corresponding pixel value when the tagged state value of the corresponding pixel of image data indicates that the corresponding pixel of image data is a non-edge pixel, the window coefficient being equal to 1/n wherein n is a number pixels of image data within the predefined neighborhood of pixels having a tagged state value indicating that the pixel of image data is a non-edge pixel; and a selection circuit, operatively connected to said filtered summing circuit and said reconstruction circuit, to select, when the tagged state value of the first pixel of image data indicates the first pixel of image data is a non-edge pixel, the summed contone image data as an image data value for the first pixel of contone image data and to select, when the tagged state value of the first pixel of image data indicates the first pixel of image data is an edge pixel, the reconstructed contone image data as the image data value for the first pixel of contone image data.

9. The system as claimed in claim 8, further comprising:
a tonal reproduction curve circuit, operatively connected to said filtered summing circuit, to perform a tonal reproduction curve operation upon the create summed contone image data to produce a corrected summed contone image data;

said selection circuit selecting, when the tag of the first pixel of image data indicates the first pixel of image data is a non-edge pixel, the corrected summed contone image data as an image data value for the first pixel of contone image data.

10. A system for converting a first pixel of image data to a first pixel of contone image data, each pixel having an associated tag indicating an edge state of the pixel, comprising:

a reconstruction circuit to create reconstructed contone image data from the first pixel of image data;

a filtered summing circuit to sum a plurality of tagged state value dependent weighted pixel values to create summed contone image data, each tagged state value dependent weighted pixel value corresponding to a pixel of image data within a predefined neighborhood of pixels of image data, the predefined neighborhood of pixels of image data having the first pixel of image data therein, a tagged state value dependent weighted pixel value being zero when the tagged state value of the corresponding pixel of image data indicates that the corresponding pixel of image data is an edge pixel and a tagged state value dependent weighted pixel value being equal to a product of a coefficient, a non-edge window coefficient, and a corresponding pixel value when the tagged state value of the corresponding pixel of image data indicates that the corresponding pixel of image data is a non-edge pixel and each pixel position within the predefined neighborhood of pixels having a coefficient value assigned thereto, the non-edge window coefficient being a value dependent upon a sum of all coefficients within the predefined neighborhood of pixels having a tagged state value of the corresponding pixel of image data indicating that the corresponding pixel of image data is a non-edge pixel; and a selection circuit, operatively connected to said filtered summing circuit and said reconstruction circuit, to select, when the tagged state value of the first pixel of image data indicates the first pixel of image data is a non-edge pixel, the summed contone image data as an image data value for the first pixel of contone image data and to select, when the tagged state value of the first pixel of image data indicates the first pixel of image data is an edge pixel, the reconstructed contone image data as the image data value for the first pixel of contone image data.

11. The system as claimed in claim 10, further comprising:

a tonal reproduction curve circuit, operatively connected to said filtered summing circuit, to perform a tonal reproduction curve operation upon the create summed contone image data to produce a corrected summed contone image data;

said selection circuit selecting, when the tag of the first pixel of image data indicates the first pixel of image data is a non-edge pixel, the corrected summed contone image data as an image data value for the first pixel of contone image data.

12. A system for converting a first pixel of image data to a first pixel of contone image data, each pixel having an associated tag indicating an edge state of the pixel, comprising:

a reconstruction circuit to create reconstructed contone image data from the first pixel of image data;

a filtered summing circuit to sum a plurality of tagged state value dependent weighted pixel values to create summed contone image data, each tagged state value dependent weighted pixel value corresponding to a pixel of image data within a predefined neighborhood of pixels of image data, the predefined neighborhood of pixels of image data having the first pixel of image data therein, a tagged state value dependent weighted pixel value being zero when the tagged state value of the corresponding pixel of image data indicates that the corresponding pixel of image data is an edge pixel and a tagged state value dependent weighted pixel value being equal to a product of a coefficient, an edge window coefficient, and a corresponding pixel value when the tagged state value of the corresponding pixel of image data indicates that the corresponding pixel of image data is a non-edge pixel and each pixel position within the predefined neighborhood of pixels having a coefficient value assigned thereto, the non-edge window coefficient being a value dependent upon a sum of all coefficients within the predefined neighborhood of pixels having a tagged state value of the corresponding pixel of image data indicating that the corresponding pixel of image data is an edge pixel; and a selection circuit, operatively connected to said filtered summing circuit and said reconstruction circuit, to select, when the tagged state value of the first pixel of image data indicates the first pixel of image data is a non-edge pixel, the summed contone image data as an image data value for the first pixel of contone image data and to select, when the tagged state value of the first pixel of image data indicates the first pixel of image data is an edge pixel, the reconstructed contone image data as the image data value for the first pixel of contone image data.

13. The system as claimed in claim 12, further comprising:

a tonal reproduction curve circuit, operatively connected to said filtered summing circuit, to perform a tonal reproduction curve operation upon the create summed contone image data to produce a corrected summed contone image data;

said selection circuit selecting, when the tag of the first pixel of image data indicates the first pixel of image data is a non-edge pixel, the corrected summed contone image data as an image data value for the first pixel of contone image data.

* * * * *